US012670419B2

(12) United States Patent
Sagi-Dolev et al.

(10) Patent No.: US 12,670,419 B2
(45) Date of Patent: Jun. 30, 2026

(54) NETWORK OF INTELLIGENT MACHINES

(71) Applicant: QYLUR INTELLIGENT SYSTEMS INC., Sunnyvale, CA (US)

(72) Inventors: Alysia M. Sagi-Dolev, Palo Alto, CA (US); Alon Zweig, Tel Aviv (IL)

(73) Assignee: QYLUR INTELLIGENT SYSTEMS INC., Sunnyvale, CA (US)

( * ) Notice: Subject to any disclaimer, the term of this patent is extended or adjusted under 35 U.S.C. 154(b) by 783 days.

(21) Appl. No.: 18/091,654

(22) Filed: Dec. 30, 2022

(65) Prior Publication Data

US 2023/0153657 A1    May 18, 2023

Related U.S. Application Data

(63) Continuation-in-part of application No. 16/741,551, filed on Jan. 13, 2020, now Pat. No. 11,544,533, (Continued)

(51) Int. Cl.
*G06N 5/043* (2023.01)
*G06F 18/21* (2023.01)
(Continued)

(52) U.S. Cl.
CPC ........... *G06N 5/043* (2013.01); *G06F 18/217* (2023.01); *G06F 18/24143* (2023.01);
(Continued)

(58) Field of Classification Search
CPC ......... G06N 5/043; G06N 3/045; G06V 20/52
See application file for complete search history.

(56) References Cited

U.S. PATENT DOCUMENTS 5,845,002 A    12/1998  Heck et al.
7,739,207 B2   6/2010  Biazetti et al.
(Continued)

FOREIGN PATENT DOCUMENTS

CN        102461071 A    5/2012
JP        2003316746 A   11/2003
(Continued)

OTHER PUBLICATIONS

Search Report corresponding to RU2015139090, dated Feb. 15, 2018, 2 pages.
(Continued)

*Primary Examiner* — Kevin W Figueroa
(74) *Attorney, Agent, or Firm* — Innovation Counsel LLP

(57)    ABSTRACT

An apparatus in a network of apparatuses includes a first processing unit that includes a first object unit that receives an item, a first test unit that applies different types of tests to the item and takes measurements, a first sensor that receives the outcomes from the tests and generates output signals, a first computation unit that receives the output signals and processes the output signals to generate parameter values; a first memory storing parameter data for the items, wherein the parameter data are useful for categorizing the item based on the measurements and output signals, and a first processing module including an artificial intelligence program. The first processing module automatically selects a source from which to receive new parameter data, automatically modifies the parameter data that are stored in the first memory using the new parameter data, and transmits the modified parameter data to a recipient.

20 Claims, 23 Drawing Sheets

Related U.S. Application Data which is a continuation of application No. 13/843, 784, filed on Mar. 15, 2013, now Pat. No. 10,534,995.

(51) Int. Cl.

| | |
|---|---|
| *G06F 18/2413* | (2023.01) |
| *G06N 3/045* | (2023.01) |
| *G06V 10/764* | (2022.01) |
| *G06V 10/776* | (2022.01) |
| *G06V 10/82* | (2022.01) |
| *G06V 20/52* | (2022.01) |
| *G06V 20/68* | (2022.01) |

(52) U.S. Cl.
CPC ........... *G06N 3/045* (2023.01); *G06V 10/764* (2022.01); *G06V 10/776* (2022.01); *G06V 10/82* (2022.01); *G06V 20/52* (2022.01); *G06V 20/68* (2022.01)

(56) References Cited

U.S. PATENT DOCUMENTS

| | | | |
|---|---|---|---|
| 2010/0002604 A1 | 1/2010 | Melick et al. | |
| 2010/0315207 A1 | 12/2010 | Bullard et al. | |
| 2011/0167936 A1* | 7/2011 | Sagi-Dolev ............ | G01V 11/00 |
| | | | 73/865.8 |
| 2011/0179052 A1 | 7/2011 | Sato | |
| 2012/0197823 A1 | 8/2012 | Wawkins et al. | |
| 2012/0330885 A1 | 12/2012 | Jaros et al. | |
| 2014/0033819 A1 | 2/2014 | Loeser et al. | |

FOREIGN PATENT DOCUMENTS

| | | |
|---|---|---|
| JP | 2011145958 A | 7/2011 |
| RU | 72084 U1 | 3/2008 |

OTHER PUBLICATIONS

Valera, Maria, and Sergio A. Velastin, "Intelligent distributed surveillance systems: a review", IEE Proceedings—Vision, Image and Signal Processing 152.2 (2005): 192-204.

Dean, Jeffrey et al., "Large scale distributed deep networks", Advances in Neulal Infmrnation Processing Systems, 2012.

Huang , Cheng-Lung, and Jian-Fan Dun, "A distributed PSO-SVM hybrid system with feature selection and parameter optimization" Applied Soft Computing 8.4 (2008): 1381-1391.

Carpenter, Gail A., and Stephen Grossberg, "A massively parallel architecture for a self-organizing neural pattern recognition machine", Computer vision, graphics and image processing 37.1 (1987): 54-115.

Nicola Bicocchi et al., "Pervasive Self-Learning with Multi-Modal Distributed Sensors", 2008 Second IEEE International Conference on Self-Adaptive and Self-Organizing Systems Workshops, 6 Pages.

Burga Gedik et al., "ASAP: An Adaptive Sampling Approach to Data Collection in Sensor Nelworks", IEEE Transactions on Parallel and Distributed Systems, vol. 18, No. 12, Dec. 2007, pp. 1766-1783.

Eduardo F. Nakamura et al., "Information Fusion for Wireless Sensor Networks: Methods, Models and Classifications", ACM Computing Surveys, vol. 39, No. 3, Article 9, Aug. 2007, 55 pages.

Hannah et al., "Decision in Condition Monitoring—An Examplar for Data Fusion Architecture", Manchester School of Engineering University of Manchester, ISIF 2000, 8 Pages.

International Search Report, corresponding to PCTIUS2014/ 019134, Oct. 28, 2014, 4 pages.

"Canadian Application Serial No. 2,903,041 First Examiner Report mailed Feb. 10, 2020" 5 pages.

* cited by examiner

NETWORK OF INTELLIGENT MACHINES

CROSS-REFERENCE TO RELATED APPLICATION

This application is a Continuation-in-Part application of U.S. patent application Ser. No. 16/741,551 filed on Jan. 13, 2020, which in turn claims the benefit of U.S. patent application Ser. No. 13/843,784 filed on Mar. 15, 2013 (now issued as U.S. Pat. No. 10,534,995). The contents of all of the above patent applications are incorporated by reference herein.

FIELD OF INVENTION

The present disclosure relates generally to a system for processing data obtained from a plurality of intelligent machines and particularly for machines that change their internal states based on input that is shared between machines.

BACKGROUND

Today, computerized machines are used to perform tasks in almost all aspects of life, such as handling purchases at store checkout stands, and taking and tracking orders at Internet shopping sites, packaging and sorting merchandise, keeping track of inventory in warehouses, tracking automobile registration data, medical screening for various conditions, and detecting the presence of certain items or conditions. In some instances, there is a single machine that handles all the transactions or activities for that organization. However, in most cases, there are many machines at different locations handling similar tasks. For example, hospitals may have different campuses with a number of MRI machines in different parts of the campuses. Similarly, grocery store chains may have many stores and warehouses across a large geographical area, each store having a number of checkout registers. Likewise, farmers and orchards may each have their own facilities to automatically sort their produce, like sorting apples into high and low grade. Such sorting machines are often based on the appearance of the product, like in the case where a video camera is used to identify bad fruits based on an automatic classifier.

There is an inefficiency stemming from the fact that the different machines are run and updated separately and independently from one another. While a huge amount of data is collected by each machine, the different machines are unable to "coordinate" with each other or learn from each other. Although the machines often have human operators attending to them to deal with any unusual situations or malfunctions, each of the operators only know what is happening with the subset of machines that he is in charge of, and does not benefit from the data in other machines. This lack of communication and shared newly learned features between machines creates inefficiency and redundancy that result in errors. In one instance, a shopper looking for a specific item may have no quick and easy way of knowing which nearby stores carry the item he is looking for. In this kind of situation, much time is wasted by the shopper finding out the phone numbers and calling each of the nearby stores to do a stock check. In another instance, a medical diagnostic machine that has few patients with fractures and utilizes its original core detection algorithm would remain with same detection capability for a long time, keeping it inferior to a diagnostic machine located at a sports medicine center that would continuously get smarter from being exposed to larger samples of such fractures. In yet another instance involving produce classification machines, an operator would have to adjust each machine individually to make sure it weeds out produce with a certain new condition that would be unappealing to customers. In yet another instance involving object detection machines scanning employees' bags for prohibited items (e.g., explosives, weapons, alcohol, cigarettes) bags of an employee from a town whose lunches contain items that are unique to that area might get misinterpreted as a bag with a prohibited content, because the machine at corporate headquarters is unaware of bag content types of other towns.

An intelligent system that eliminates the inefficiency and redundancy and increases the accuracy by allowing machines to coordinate, communicate, and learn from each other is desired.

SUMMARY

In one aspect, the disclosure pertains to a self-updating apparatus in a network of apparatuses that is configured to characterize items or conditions. The apparatus includes: a first processing unit that includes a first object unit that receives an item, a first test unit that applies different types of tests to the item and takes measurements, a first sensor that receives the outcomes from the different types of tests and generates corresponding output signals, a first computation unit that receives the output signals and processes the output signals to generate parameter values; a first memory storing parameter data for the items, wherein the parameter data are useful for categorizing the item based on the measurements taken from the item and characteristics calculated using at least one of the measurements and output signals, and a first processing module including an artificial intelligence program. The first processing module automatically selects a source from which to receive new parameter data, wherein the first processing module selects the new parameter data to receive based on similarity between measurements taken by the first processing unit and measurements that were taken by the source, automatically modifies the parameter data that are stored in the first memory with the new parameter data received from the source to generate modified parameter data, and transmits a subset of the modified parameter data to a recipient. At least one of the source and the recipient is a second processing unit that is configured similarly to the first processing unit.

In another aspect, the disclosure pertains to a non-transitory computer-readable storage medium storing instructions for categorizing items, wherein the non-transitory computer-readable storage medium is part of a network of apparatuses. The non-transitory computer-readable storage medium includes: instructions for the first processing unit to receive an item, take measurements of the item, and apply different types of tests to the item, instructions to receive outcomes from the different types of tests and generate corresponding output signals; instructions to process the output signals to generate parameter values, instructions to store parameter data for the item in a first memory, wherein the parameter data are useful for categorizing the item based on at least one of the measurements and output signals, instructions to automatically select a source from which to receive new parameter data, wherein the first processing module selects the new parameter data to receive based on measurements taken by the first processing unit, instructions to automatically modify the parameter data that are stored in the first memory using the new parameter data received from the source to generate modified parameter data, and instructions to transmit a subset of the modified parameter data to a recipient, wherein at least one of the source and the recipient is a second processing unit that is configured similarly to the first processing unit. For example, the apparatuses in the network may include a threat detection machine capable of screening items based on a combination or two or more tests.

DESCRIPTION OF THE DRAWINGS

FIG. 7A is a computer image of fruit showing soft puff and crease as detected by the machine of FIG. 5.

FIG. 8 is a histogram obtained from a surface of a fruit having sour rot.

FIG. 9 is a histogram obtained from a surface of a fruit having clear rot.

FIG. 10 is a histogram obtained from a surface of a fruit having a pebbled peel.

FIG. 11 is a histogram obtained from a surface of a fruit showing soft puff and crease condition.

FIG. 12 is a histogram obtained from a surface of a fruit showing a ridge and valley defect.

FIG. 14 is a histogram obtained from a fruit having clear puff and crease condition.

DETAILED DESCRIPTION

Figure 1:
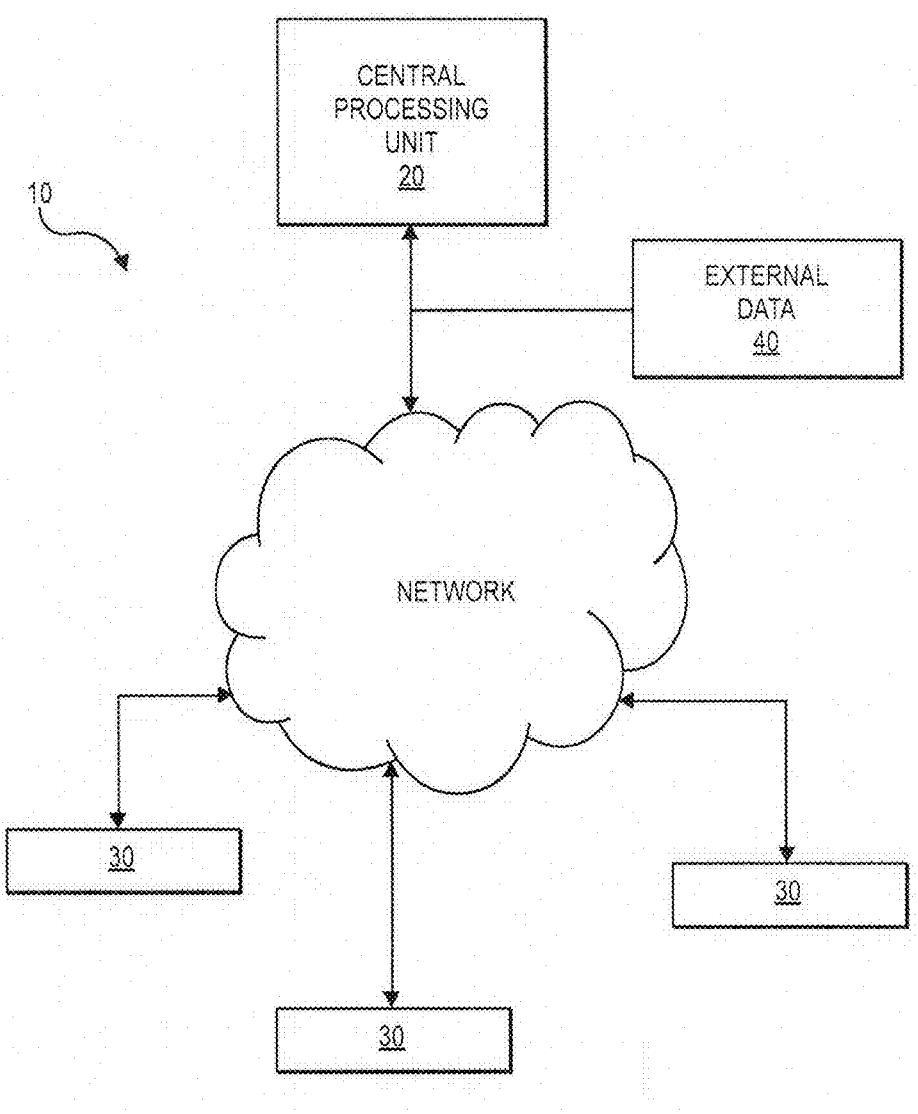
FIG. 1 depicts a machine network system that includes a plurality of machines that communicate with each other and with a central processing unit.

Embodiments are described herein in the context of machines that classify fruits according to their grades, and in the context of threat detection machines. However, it is to be understood that the embodiments provided herein are just examples and the scope of the inventive concept is not limited to the applications or the embodiments disclosed herein. For example, the system of the disclosure may be useful for any type of equipment that is capable of automatically learning rules from examples (machine learning algorithms), including but not limited to a machine that employs artificial neural network and is capable of iterative learning, such as medical diagnostic machines, fault testing machines, and object identification machines.

As used herein, "remotely located" means located in different forums, companies, organizations, institutions, and/or physical locations. Machines that are located on different floors of the same building, for example, could be remotely located from each other if the different floors host different organizations. A "processing unit," as used herein, includes both a central processing unit (20) and a machine (30) or a group of machines (50). "Parameters," as used herein, include central parameters and internal parameters, and include data and sets of data and functions, either static or dynamic. Examples of a "parameter" include but are not limited to color, wavelength, density, effective atomic number, diameter, weight, electrical conductivity, content of a specific chemical or material. A "parameter value" is a measured value, such as "red," 690 nm, 3 inches, 15 grams, $3.5 \times 10^7$ S/m, 10 g of potassium chlorate, etc. "Parameter data" include any conditions or definitions based on parameter values, such as "wavelength between 650 nm and 700 nm" or "density greater than 0.5 g/cm³" and mathematical combinations of parameter values such the sum of wavelengths and color divided by density" An apple, for example, will be associated with a certain set of parameter data or mathematical combinations of parameter values such that when an apple is received by a processing unit, the processing unit will recognize it as an apple based on the item's parameter values.

The system of the disclosure is useful for coordinating information exchange among a plurality of machines. This disclosure discusses a network of machines in communication with each other, which examines the collective body of data from the different machines to generate and modify a set of central parameter data. The machines may be remotely-located from the central processing unit and in different places around the world. By being networked, the different machines can learn from one another and utilize the "knowledge" gained from different machines to teach and improve its counter parts. For example, where the machines are fruit-sorting machines, the machines may learn and adjust to a trend that a new condition affecting citrus fruits is showing up at different locations around the world. The central processing unit may be able to either figure out a way to detect this condition based on this data, or utilize the adjusted updated local central parameter data in that machine, determine which geographical locations are susceptible to this condition, and transmit information and new central parameter data to the machines in these locations that will help detect this new condition so the fruits with the new defect can be rejected.

The central processing unit sees and analyzes the data from a high level using a global network of detection machines. Hence, the system of the disclosure allows an intelligent, better-informed understanding of a situation that cannot be provided by individual machines alone.

FIG. 1 depicts a machine network 10 that includes a central processing unit 20 in communication with a plurality of machines 30 via a network. The central processing unit 20 is configured to receive and selectively transmit information to the machines 30. Each machine 30 may be one machine unit or a group of units, and typically includes hardware components for receiving items to be tested. In some cases, a plurality of machines 30 are grouped to form a "group" or "family" 50 of machines 30 that directly share data among themselves without going through the central processing unit 20. Machines 30 in a family 50 of machines often have a commonality, such as presence in a same general geographic region, configuration to handle specific fruit types (e.g., citrus fruit), or representing the same company. The machines 30 test each item that is received and characterizes the item according to a set of internal parameter data. For example, in the case of fruit-sorting machines, the machine 30 may characterize each fruit as "reject," "juice," "Grade B," and "Grade A." The machines 30 are configured to transmit data to the central processing unit 20, which collects data from all the machines 30 and develops its own central parameter data. In one embodiment, the central processing unit 20 initially receives data from the machines 30 to self-train and generate its own set of central parameter data. As more data is received, the central processing unit 20 refines and modifies its central parameter data such that accuracy and breadth of the characterization is enhanced over time.

The machine 30 would typically be used to characterize an item, for example by detecting the presence of a condition. The machine 30 may be a fruit sorting machine, a detection machine, a store checkout machine, a medical diagnostic machine, a fault detection machine etc. The inventive concept is not limited to being used with any particular type of machine. For example, the machine 30 could be part of a security check system at the entrance of a high-tech manufacturing facility, in which case it could be used to detect the presence of any digital storage devices that may be used for misappropriating intellectual property or technical data. A machine at the entrance/exits of stores could be used to detect stolen merchandise. A fault detection machine could detect micro cracks in air plane wings, and a medical diagnostic device could detect types of cancer, fractures or other conditions. A fruit sorting machine would detect bruises or damage on the fruit. If the presence of a target item is detected, an alarm will be generated to invite an operator who can confirm the presence of the target item/condition, or to activate an automatic response such as locking in the undesired item, re-directing it to a trash bin, opening a repair ticket, or placing a comment in a medical file.

Different machines encounter different items and conditions, are exposed to different information, and may learn and develop different classification/characterization rules. Hence, each machine 30 has a unique set of strengths and weaknesses. Each machine 30 sends data to other machines 30 and the central processing unit 20 and receives information from other machines 30 and the central processing unit 20. The communication between different machines as well as between the machines 30 and the central processing unit 20 can be achieved through any secure network using a predetermined protocol.

A processing unit (e.g., a machine 30) determines which data should be sent to which other processing units based on data comparison among the machines 30. For example, if data comparison reveals that Machine X has encountered items that Machine Y has not encountered yet, Machine X may transmit parameter data for the items that Machine Y has not encountered to Machine Y, so that Machine Y will recognize the item when it first encounters the item. In another example, where a fig sorting machine 30 and an orange sorting machine 30 compare data with each other and other machines 30, the fig sorting machine and the orange sorting machine may notice that some of the other machines sort items that are generally round and share similar characteristics as figs and oranges. They may transmit data to those machines and perhaps obtain parameter data and values from those machines, so that both sets of machines can distinguish between figs, oranges, and other items. Even if the fig sorting machine has never countered an orange directly, it will be able to recognize an orange if one were to be received by it because it learned the orange parameter data from the orange sorting machine.

In another example, a security check machine in Building A may frequently encounter USB devices carried by employees. A security check machine in Building B, on the other hand, may not have encountered USB devices from its employees and customers. Upon comparison of items between the machines at Building A and Building B, the machine at Building A may send parameter data for USB devices to the machine at Building B. If a third machine at Building C already has its own parameter data for USB devices, machines at Buildings A and C may compare their internal parameters and make any updates to further refine the parameter data (e.g., the size range may be broadened to cover different brands, while density may be adjusted for the additional range of size).

As explained, the machines and processing units can "learn" from each other by comparing and updating their parameter data. In some cases, parameters that are missing in one processing unit are added by being received from another processing unit. In other cases, parameters that are different yet identify the same item triggers the processing units to modify one or more sets of parameter data to strengthen the characterization capability.

In one embodiment, each machine 30 or a group of machines 30 incorporates an artificial intelligence program and is able to learn or change their internal states based on input. For example, the machines 30 may learn about ordinary items as more items pass through it. The machines may, for example, incorporate a neural network. In the beginning, the synaptic weights and thresholds of the neural network are initialized and a first set of items are introduced to the machines to receive an output. For example, where the machines 30 are fruit-sorting machines, the output would be a classification assigned to each fruit (e.g., Grade A, Grade B, juice, reject). A machine trainer will initially feed a randomly mixed batch of fruits to the machine 30 and provide input as to how each fruit is categorized, thereby "training" the machine 30. This type of machine training is well known. The machine 30, by using the measurements and the outcomes that each set of measurements was supposed to produce, generates a set of conditions for identifying how a fruit should be categorized. The machine runs tests on the items, makes measurements, and generates a set of parameter data for each item. Each machine has a storage unit that records the parameter values of all the items it encountered. After the initial training with a set of fruits, each machine has a set of internal parameter data that it uses to characterize the next fruit that is received. The more fruits a machine 30 or a group of machines 30 has seen, the more data points it will have in its memory and the more accurate the next characterization will be. The internal parameter data are continually modified to enhance the accuracy of characterization.

In one embodiment, each machine 30 transmits the parameter data of all the items it encountered to the central processing unit 20. The central processing unit 20 maintains a set of central parameter data. The central processing unit 20 processes the data received from the plurality of machines 30 in the system by running each input to generate and modify the central parameter data, which are used to characterize the next fruit.

The central processing unit 20 also incorporates an artificial intelligence program. As the central processing unit 20 receives data from all the machines 30 in the network, it will develop a broader set of parameter data that cover all the global possibilities. Furthermore, the central processing unit 20 will be able to analyze regional trends, unlike the machines 30. Based on the trends and patterns it sees, the central processing unit 20 can prepare certain machines for new parameters or parameter data they will encounter. Alternatively, machines 30 can directly share with each other data that they encountered, effectively "educating" one another.

The central processing unit 20 also receives external data 40, such as intelligence data or any data to be selectively distributed to the machines 30. The external data 40 may include intelligence information or details about situations in certain regions. For example, suppose a situation where the machines are detection machines. If a valuable painting is stolen in Florence, Italy, the outside data can be used to inform the central processing unit 20 of this situation. The central processing unit 20 can, in response, adjust the parameter data to heighten the sensitivity for paintings (e.g., by adding a range of spectroscopy analysis value) and transmit the adjusted parameter data to the machines so that the machines will almost immediately be "looking for" the stolen painting. Likewise, if a stadium has long lines that are moving slowly, a request can be input to lower the sensitivity level of the machines at the entrance to help move the lines along faster. In another instance involving the produce sorting machine, information regarding expected weather trends in a given geography can alert the system to heighten the detection of certain types of damage that are correlated to this weather. In another instance, a turbine safety inspection machine may learn pattern of certain blade damage due to increased feather residues from increased bird migration during certain seasons and geographies and adjust those machines to increase sensitivity for those inspection machines each year at that period and in that region. The external data 50 may be input by the machine trainer 40 or from another source.

Figure 2:
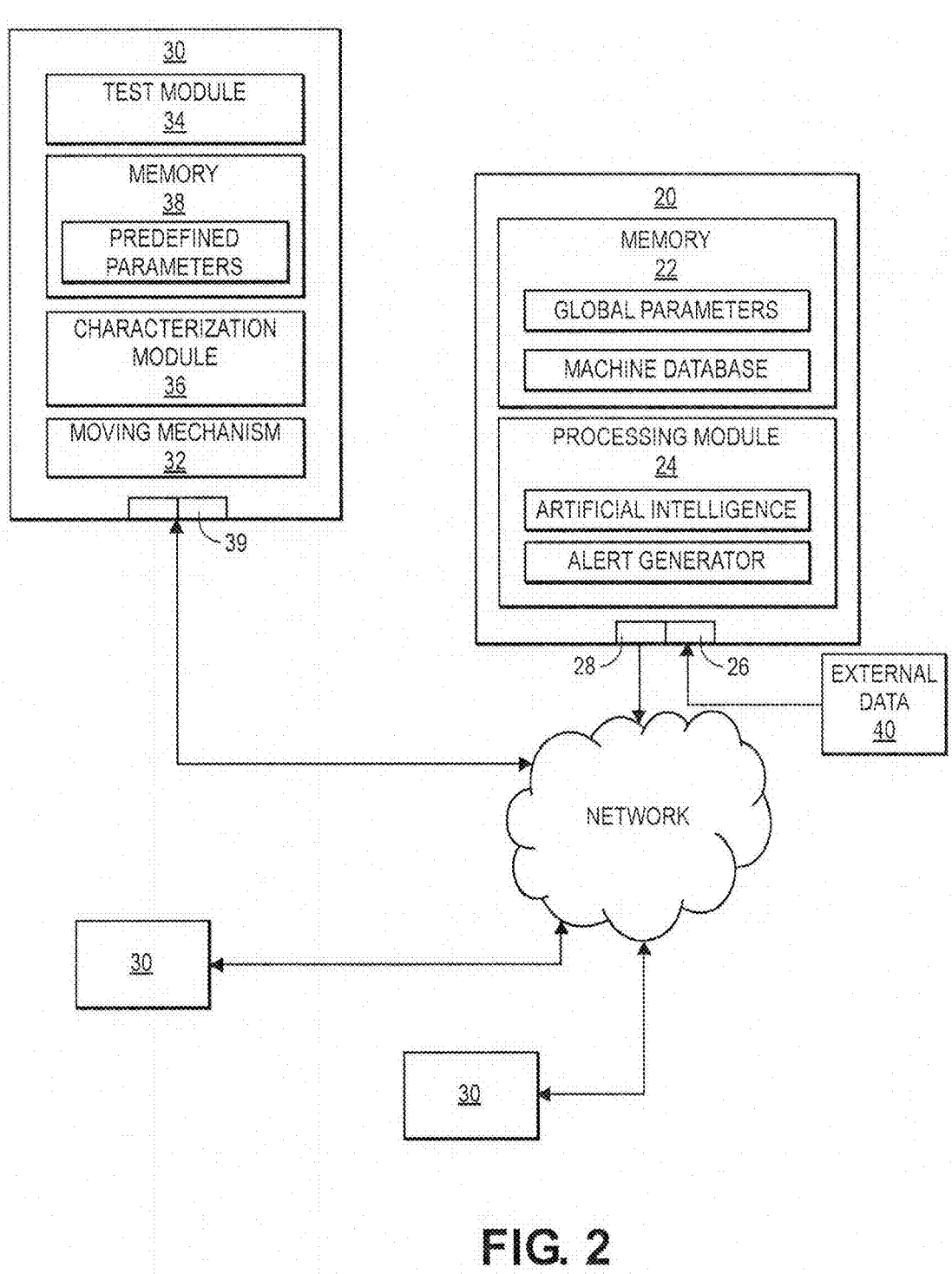
FIG. 2 is a detailed depiction of the machines and the central processing unit.

FIG. 2 depicts one embodiment of the machine 30 and the central processing unit 20. Each machine 30 has a processing module 32 that employs artificial intelligence and a memory 38 that stores internal parameter data. The processing module 32 and the memory 38 are together referred to as a "processing unit" (32+38). In addition to having a processing unit, the machine 30 is configured to receive items, move the received items, for example with a moving mechanism, and subject each item to one or more tests via a test module 34. The test may be a simple determination of shape or weight, and may be a more complex form of imaging, as well as any other known tests that would help analyze or detect a condition. Using the test results (e.g., measurements), a characterization module 36 characterizes the item. The test module 34 and the characterization module 36 are together referred to as a "measurement unit" (34+36), and includes physical components for receiving, holding, and testing items. If more information is needed to characterize the item, the machine 30 requests extra information from an external source, such as an operator or additional sensors. In characterizing the item, the machine 30 uses the internal parameter data stored in a memory 38. The internal parameter data were previously generated by correlating items with different conditions with their characterization. Hence, the characterization includes comparison of the measurements (e.g., parameter values) against the internal parameter data. As more extra information is received, each machine may update or modify its set of internal parameter data. The machine 30 has a receiver/transmitter 39 for exchanging information via the network.

The central processing unit 20 includes a processing module 24 that includes an artificial intelligence program, and a memory 22 that includes a machine database for storing central parameters and data about the different machines in the network. The processing module 24 and the memory 22 are together referred to as the "processing unit" (24+22). The central processing unit 20 generates its own set of central parameter data based on the measurement and characterization data it received from the machines 30. The central parameter data are likely to be much more extensive and inclusive compared to the local internal parameter data on any single machine 30 because while each machine 30 only encounters the items that it directly handles, the central processing unit 20 has a global perspective. The machine database keeps track of all the machines that send information to it. Upon receiving data, the central processing unit 20 may tag the data with a machine ID to track which machine, group of machines, or family of machines that share knowledge, the data came from. This way, the central processing unit 20 can catch any trends such as weather or other external common phenomena, or be on the lookout for a pattern that may be a warning sign. The central processing unit 20 also uses the machine database to determine which machine will benefit from a new update/modification to the parameter data.

As shown, the central processing unit 20 and each machine 30 has a receiving portion 26 and a transmitting portion 28 for communicating to other machines 30 and processing units in the network. The receiving portion 26 and the transmitting portion 28 may be one physical component. As mentioned above, the central processing unit 20 also receives external data 40 from a source other than the machines 30. When the processing module 32 of a machine 30 determines that there is an unusual situation at hand or the situation may need a warning, it generates an alert via the alert generator. Upon receiving the alert, either internal system reactions would take place to trigger an action (such as redirecting the item) or a human operator would be able to assess the situation and respond appropriately. The alert may be some type of audiovisual output to a device accessed by the operator.

Although not explicitly shown, both the machines 30 and the central processing unit 20 can include a user interface for communicating with an operator and/or machine trainer.

Figure 3:
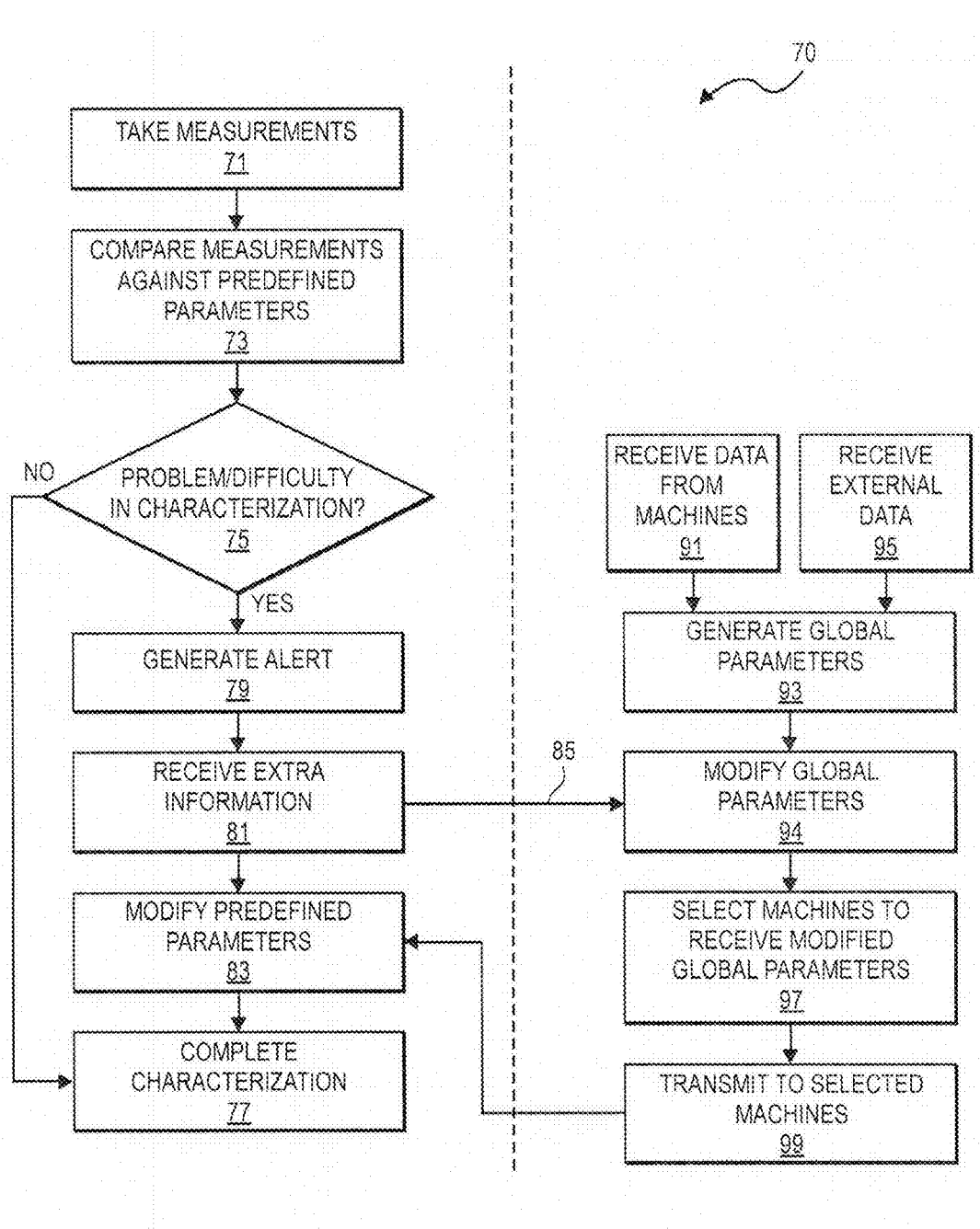
FIG. 3 is a flowchart illustrating the parameter updating process.

FIG. 3 illustrates the iterative parameter updating process 70 of the machine network system 10, as well as the iterative data flow between the machines 30 and the central processing unit 20. The iterative data flow may happen directly between different machines 30, or between machine groups (each "machine group" includes a plurality of machines). As shown, a machine 30 receives items and subjects each item to a test to obtain measurements (step 71). In this flowchart, it is assumed that the machine 30 has already received its initial training and has a preliminary set of parameter data. The measurements are then compared against these parameter data to determine an outcome (step 73). If the measurements fit substantially well with the parameter data that is associated with one of the previously encountered items (step 75—"no"), the machine 30 concludes that no new item/situation is encountered and proceeds to characterize or process the item consistently, the way that it is trained to process items with those parameter values (step 77). The machine 30 may store, either in a local storage unit or at the central processing unit 20, data from the scan regardless of the outcome. If the measurements do not match any previously encountered set of parameter data well enough (step 75—"yes"), an alert is generated to either trigger an automated response or alert an operator (step 79). The operator examines the item, reviews the measurements (parameter values), and subjects the item to additional tests if desired to come up with a characterization. In some embodiments, the machine 30 collects additional information. The operator then provides feedback (extra information) to the machine by inputting his characterization (step 81). The machine updates its parameter data to incorporate the extra information that it just received (step 83). The measurements that triggered the alert and the operator input are either retained within the machine 30, and or transmitted to other machines 30, and or transmitted to the central processing unit 20 (step 85).

The machines 30, groups of machines 50, or the central processing unit 20 receives measurements and characterizations from machines in the machine network 10, which are often at different locations (step 91). The central processing unit 20, the machines 30, and/or groups of machines 50 receive data independently of the machines 30 and has its set of central parameter data (step 93) from previous training. The training may be based on its own internal data sets or data sets received from other machines 30, families of machines 50 and/or the central processing unit 20. As mentioned above, the central processing unit 20 also receives external data (step 95).

The machines 30 and/or the central processing unit 20 continually modifies its central parameter data 94 based on the measurement data it receives from the machines 30, families of machines 50, and the central processing unit 20 and the extra information 81 that pertains to previously un-encountered items/conditions. Central parameter data help the machines 30, family of machines 50, and the central processing units 20 to identify which items are being encountered by almost all the machines, so the parameter data for that items can be strengthened. Central parameter data may be used to selectively increase the "resolution" of detection. Once central parameter data are modified, the central processing unit 20, the machines 30 and/or families of machines 50 identifies, either for its self or other, machines that would benefit from the updated parameter data, e.g. the machines that would encounter the condition/item that is affected by the updated parameter data (step 97). For example, where the newly found condition is due to a fruit disease that is only in a certain region, parameter data for the condition would not be sent to machines at other locations. On the other hand, if the parameter data pertain to a condition that is applicable to any location (e.g., a bruise) the parameter data may be sent to all the machines 30. The updated parameter data are then transmitted to the identified select machines (step 99).

The machines 30 that receive the modified central parameter data may further modify their own internal parameter data to reflect the modified central parameter data. This way, the machines 30, other machines 30, other families of machines 50 and the central processing unit 20 are continually teaching and learning from one another. The machine 30 in the machine network 10 learns from multiple sources: 1) items that pass through the machine, 2) extra information received, e.g. from the local operator, 3) updated parameter data received from the central processing unit 20, 4) new data and updated parameter data from itself, 5) data and updated parameter data from other machines 30, or families of machines 50.

Figure 4:
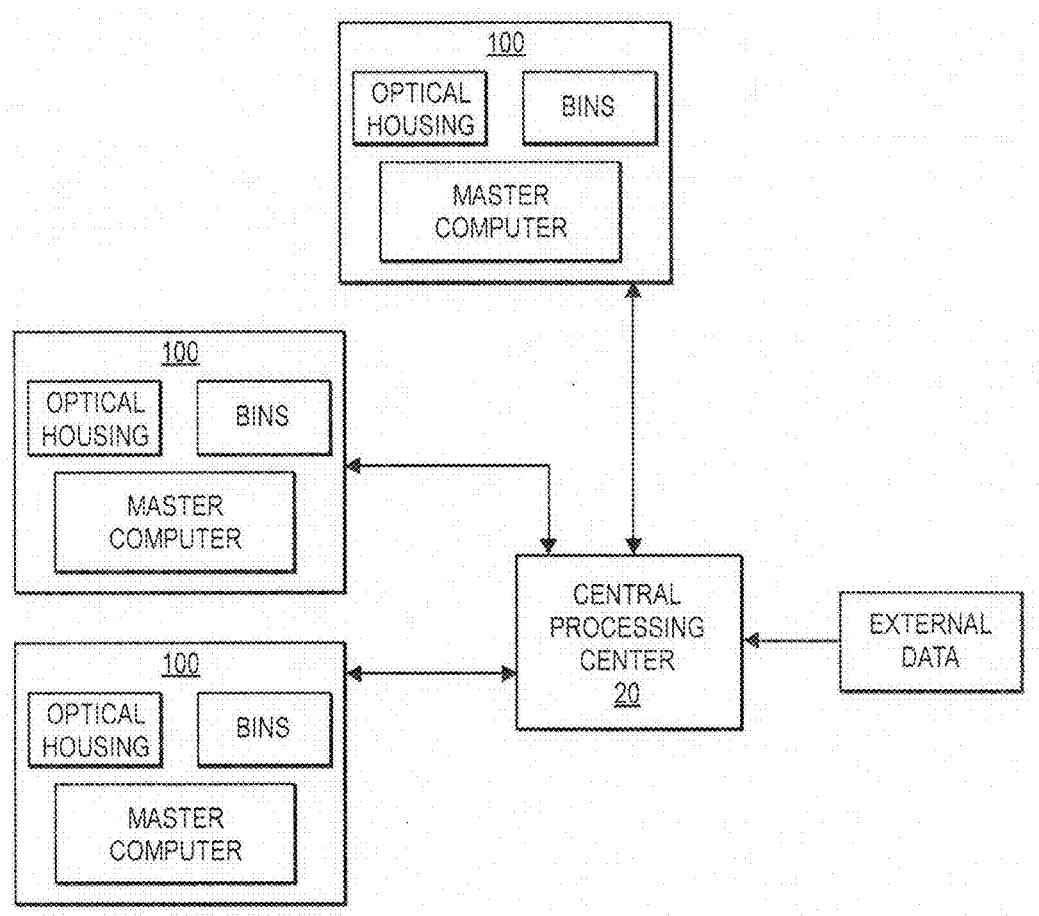
FIG. 4 depicts an example embodiment where each machine is a sorting machine.

FIG. 4 depicts an embodiment where each machine 30 is a sorting machine 100. The sorting machine 100 may be a fruit sorting machine that incorporates the features described in U.S. Pat. No. 5,845,002 and is enhanced with the processing unit 32+38 to include artificial intelligence and internal parameter data. Although the inventive concept is not limited to being used with any particular type of machine, the disclosure is provided to provide a concrete example of how the processing module 32 in machine 30 and or central processing unit 20 may be used.

Figure 5:
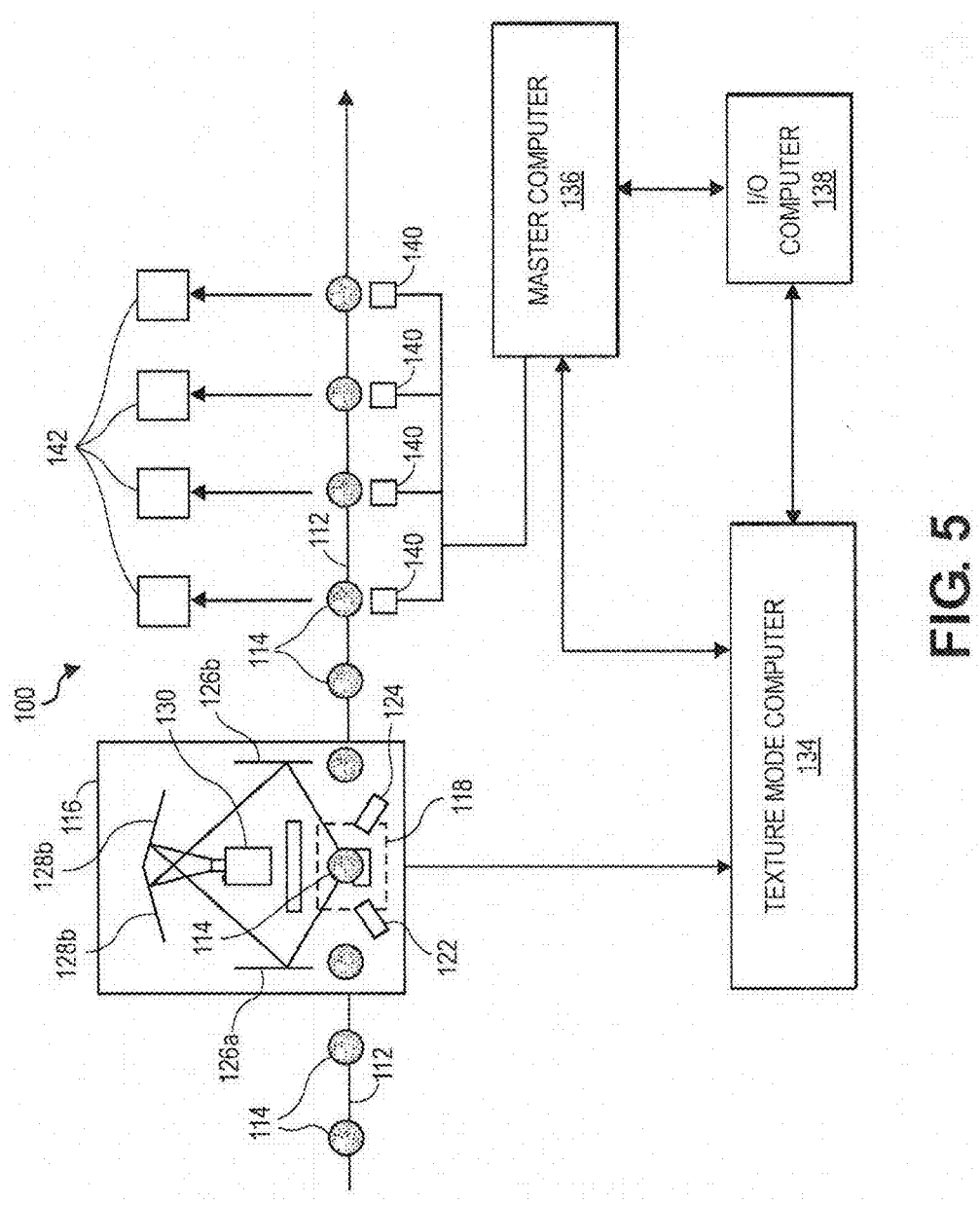
FIG. 5 depicts one of the machines of FIG. 4 in more detail.

FIG. 5 shows select parts of the sorting machines 100 in more detail. As shown, the sorting machine 100 includes a conventional conveyor line 112 upon which a plurality of items 114 are conveyed. For simplicity of illustration, this particular depiction does not show the processing unit, although the processing unit is part of the sorting machine 100. This is just one example embodiment, and use of a conveyor line is not a limitation of the inventive concept—items can be examined in static situations or utilizing other movement mechanisms such as robotics. The items 114 are fruit (e.g., citrus fruit) in the context of this disclosure, although this is not a limitation of the inventive concept. The particular sorting machine 100 may be suitable for items that are generally spherical and have a topographic surface texture. In other embodiments, the sorting machines 100 may be replaced by medical examination machines, object screening machines, etc.

The conveyor 112 transports the fruit 114 into an optical housing 116, where the fruit is illuminated at an inspection station 118 within an optical housing 116. The conveyor 112 transports and orients the fruit 114 to control the presentation of the fruit 114 for imaging. The conveyor is designed to provide a maximum optical exposure of fruit 114 at inspection station 118. Conveyor system 112 in the illustrated embodiment includes driven spools to rotate the fruit 114. In the embodiment of FIG. 4 and FIG. 5, the fruit 114 is rotated in a retrograde direction as it moves through the inspection station 118 to at least partially compensate for its forward motion down conveyor 112. The fruit 114 is rotated so that the same surface tends to remain facing a camera 130 during an extended time exposure to allow complete and reliable imaging. This may, of course, be time-synchronized by means well known in the art.

When the fruit 114 is carried by the conveyor 112 into the housing 116 and to inspection station 118, the fruit 14 is illuminated by a pair of light sources 122, 124. The light sources 122, 124 are focused on the fruit 114 from below and may further be provided with conventional optics to assist in providing optimal illumination of the surface of the fruit 114.

The optical sources 22, 24 may be optical fibers, or laser beams or light beams formed by LEDs. Alternatively, a single light source may be utilized and may be optically divided into two optical sources 22, 24. The light sources 22, 24 (or a single light source) provide the incident light that will be scattered within the fruit to cause it to glow. The frequency or frequency spectrum of the light is selected based on the optical properties of the item to be inspected, to produce the desired scattering within the item, and the resultant projection of that glow through the surface thereof. With citrus fruit, the ordinary visible spectrum may suffice.

The camera 130 is coupled to a texture mode computer 134. The texture mode computer 134 is a personal computer coupled to both a master computer 136 which runs the functions of the conveyor and sorting systems and to an input/output computer 138, which provides user input and output access to the system 100. The texture analysis of the fruit 114 is made by the texture mode computer 134. According to user instructions, input through input/output computer 138 to master remote computer 136 will implement a sorting operation as dictated by texture mode computer 134 at a plurality of sorting stations 140, which may include solenoid-actuated ejection fingers upon which the fruit 114 rides, and by which the fruit 114 is ejected from the conveyor line 112 into appropriate sorting bins 142 or secondary conveyors.

The texture module of the sorting machine 100 is made up of three subsystems that include the lighting and optics (including the optical housing 116), imaging as provided by the cameras 30 and mirrors 126a, 126b, 128a, 128b, and image processing within the texture mode computer 134.

The central input/output computer 138 and the master remote computer 136 are conventional and are substantially the same as used in prior art classification and sorting apparatus. The central input/output computer 138 provides for system control including providing for all aspects of user interface, selection for input and output of various classification parameters, and for determining conveyor paths in the machine 100 where multiple lanes for the conveyor 112 are provided in a more complex array than the simple linear depiction of FIG. 4.

For certain applications, it may be desired to use a specific wavelength or spectrum of incident light, so that a desired optical effect may accentuate the particular type of defect in that type of item to be monitored. It is left to the reasonably skilled practitioner, faced with the particular type of item and defect, to determine the correct frequency or spectrum of the incident light.

The inspection station 118 is appropriately baffled as desired, either to provide flat black nonreflecting surface to avoid spurious images, or to include reflective surfaces if desired to increase the light intensity incident upon the fruit. In the embodiment illustrated in FIG. 5, the glow from light scattered within the fruit 114 and projected through its peel is reflected from lower mirrors 126a, 126b, and from there to upper mirrors 128a, 128b. A CCD matrix or scanning camera 130 has its optics 132 focused on the upper mirrors 128a, 128b to capture, in a single computer image, virtually the entire exterior surface of a hemisphere of fruit 114.

Figure 6:
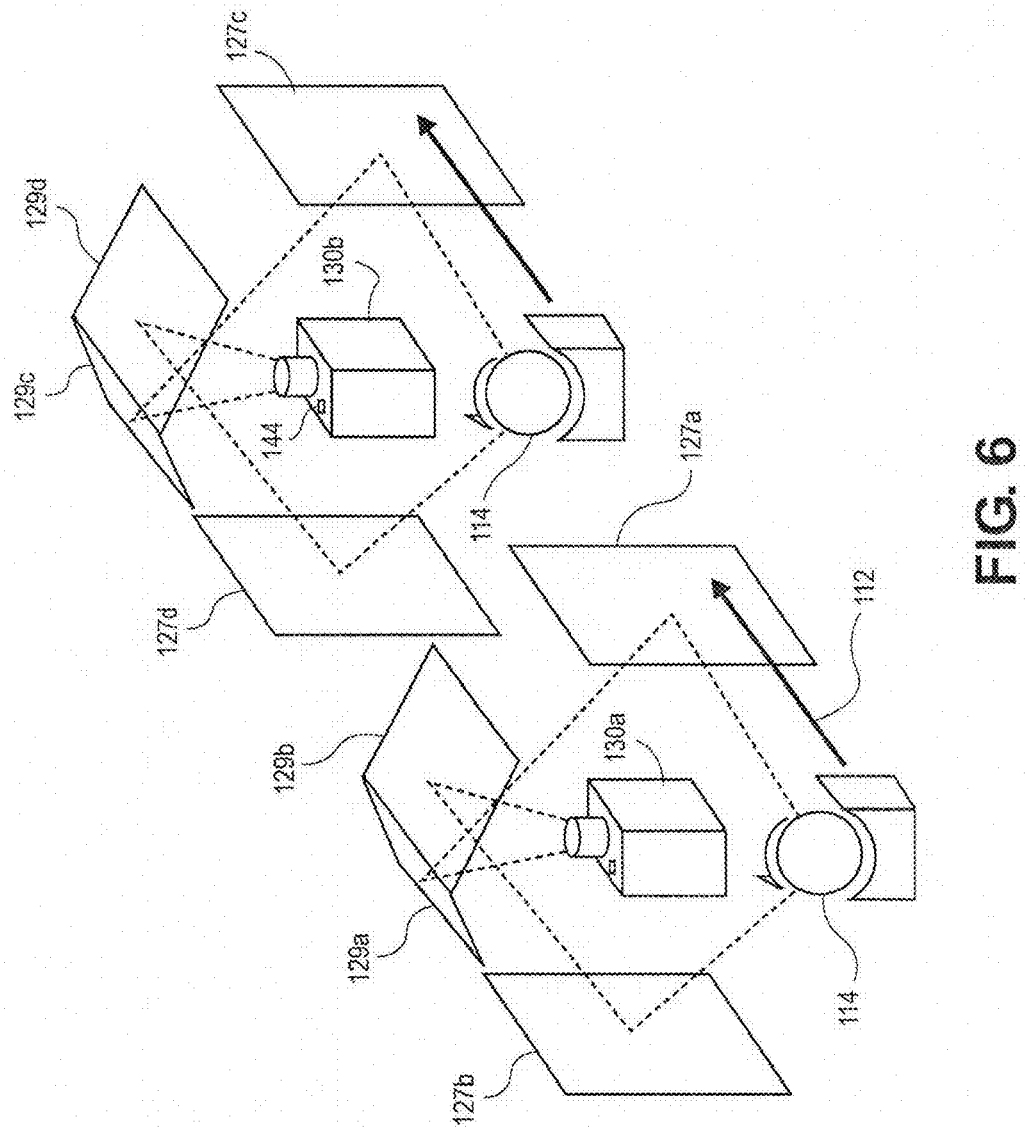
FIG. 6 depicts an optical unit portion of the machine in FIG. 5.

As shown in FIG. 6, there are two cameras 130a, 130b, each of which captures an image of one of the two hemispheres of the fruit 114. For example, the first hemispheric image of the fruit 114 is reflected by the lower right mirror 127a to the upper left mirror 129a and from there to the first camera 130a. The image of that first hemisphere is also reflected by the lower left mirror 127b into upper right mirror 129b in the first camera 130a.

After the fruit 114 has proceeded down the conveyor 112 and experienced a synchronized rotation to expose its other hemisphere, the image of the second hemisphere of the fruit 114 is reflected by the lower right mirror 127c to the upper left mirror 129c, and from the lower left mirror 127d to the upper left mirror 129d, both resultant images being reflected into the other camera 130b.

The lighting system uses two tungsten Halogen projection lamps 122, 124 situated on opposite sides of the fruit 114 and below the fruit centerline. The lamps emit enough light of the proper frequency or spectrum incident on the fruit 114 to create a glowing effect transmitted through the peel/skin of the fruit 114 that can be detected by a camera. In other words, the fruit will provide a glowing effect to the camera provided that the positioning, intensity, and frequency/spectrum of the light is such that the light penetration into the peel or rind of fruit 114 occurs and is scattered therewithin to provide a glowing effect through the peel.

There is no special filter on the camera 130, and time exposure of the imaging is electronically controlled. Electronic control of the time exposure compensates for any difference in the intensity of the glow due to differences in fruit size and peel thickness. This can be determined during the initial part of the run and appropriate corrections, either automatic or manual, may be entered through the input/output controller 138.

Automatic control may be effected by user of a photodiode 144 mounted on each camera 130 to generate an output frequency, by a frequency generator (not shown), which depends upon the amount of light sensed by each photodiode. By using the output frequency from the frequency generator controlled by photodiodes 144, the exposure time on the CCD chip within cameras 30 is controlled.

There are a large number of ways in which the fruit 114 may be illuminated, as well as ways in which a computer image may be taken of the fruit 114, either with the user of one or more cameras and various optical systems and configurations. A substantially complete computer image of each fruit 114 is provided so that texture characterizations as discussed below will not omit any significant portion of the fruit surface. For some applications, an image of one hemisphere only, using a single camera 30 and simplified optics, may be sufficient.

The texture mode computer 134 performs image processing and passes the classification information to the rest of the system for final drop-out selection according to means known in the art.

Figure 7A:
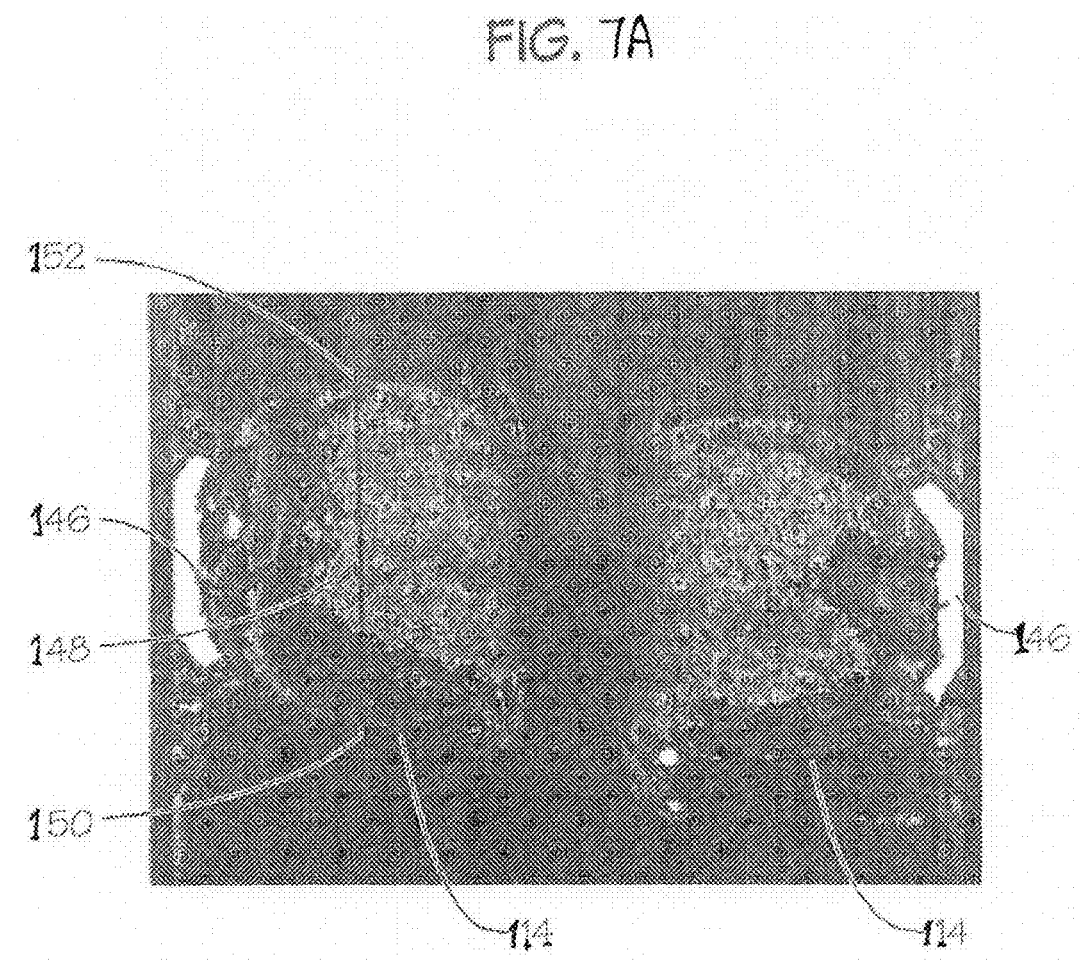

Now, processing of the captured image to provide topographic surface texture grading will be described. In the illustrated embodiment, the first step is to drop out invalid information such as reflected light intensities from the light sources 122, 124 which do not constitute the glow from light scattered within the fruit 114 and emerging through its peel. Turning to FIG. 7A, bright portions 146 of an actual computer image of a smooth fruit peel are depicted. Two images of fruit 114 are shown in FIG. 7A, depicting in essence the two hemispherical views of the fruit. Thus, regions 146 of the graphic image, because of their distinctively higher intensity levels, can be eliminated as portions of the graphic information signal carrying no information about the topographic surface texture.

A scan of the fruit surface is made to provide maximum, minimum, and standard deviation of the intensity of the entire pixel pattern constituting the image, to provide an indication if there are intensity variations in the image which could constitute surface defects requiring further examination, such as puff and crease, peel, cuts, punctures, etc.

A puff in a citrus fruit is an area of the peel which is slightly detached from the underlying meat, and thus will be slightly swollen or "puffed out." A crease is the reverse, in which a portion of the rind surface has been depressed relative to adjoining areas.

If no defects are detected, then the graphic image is checked for high frequency data which, for example, would be indicative of pebbliness of the fruit surface. The data derived from the fruit 114 can then be fed back to the master computer 136 for classification purposes according to predefined criteria.

In an instance where global statistical analysis of the fruit surface indicates that peel defects exist, the type of defect can then be determined by applying a series of data filters to identify them. The high pass data filter can be used to search for cuts or punctures. A low pass filter with blob analysis, tracing and aspect ratio of areas of greater intensity is useful to identify puff and crease and to distinguish it from rot.

After the puff and crease data is separated, a series of checks to show peak intensities over standard deviation values can be used to identify the degree of defect within a category of defect, such as puff and crease. After this processing is done, the size of the fruit as a whole is compared with the area affected in order to generate a percentage value for the defect of the affected surface. Other defects, such as rot or breaks in the rind may not be subject to a percentage evaluation, but may constitute a cause for immediate rejection of the fruit regardless of the percentage of the affected area of the fruit.

FIG. 7A, in which a computer image of a smooth orange rind is depicted, illustrates the double image from the reflected image provided to the camera. Brightened areas 146 from the illumination source are eliminated as not containing information relevant to the nature of the peel condition. Statistical information is then taken of the entire graphic image to obtain maxima, minima, and standard deviations to characterize the intensity variations of the image pixels. In this case, the statistical deviations which would be returned would indicate that the fruit was smooth and well within the acceptable range. At that point, further statistical analysis would not be performed, and the fruit position tagged within the sorting machine 100 and carried down conveyor 112 to be routed to the appropriate sorting bin 142 or secondary conveyor, or for analysis and classification according to additional methods and criteria.

Figure 7B:
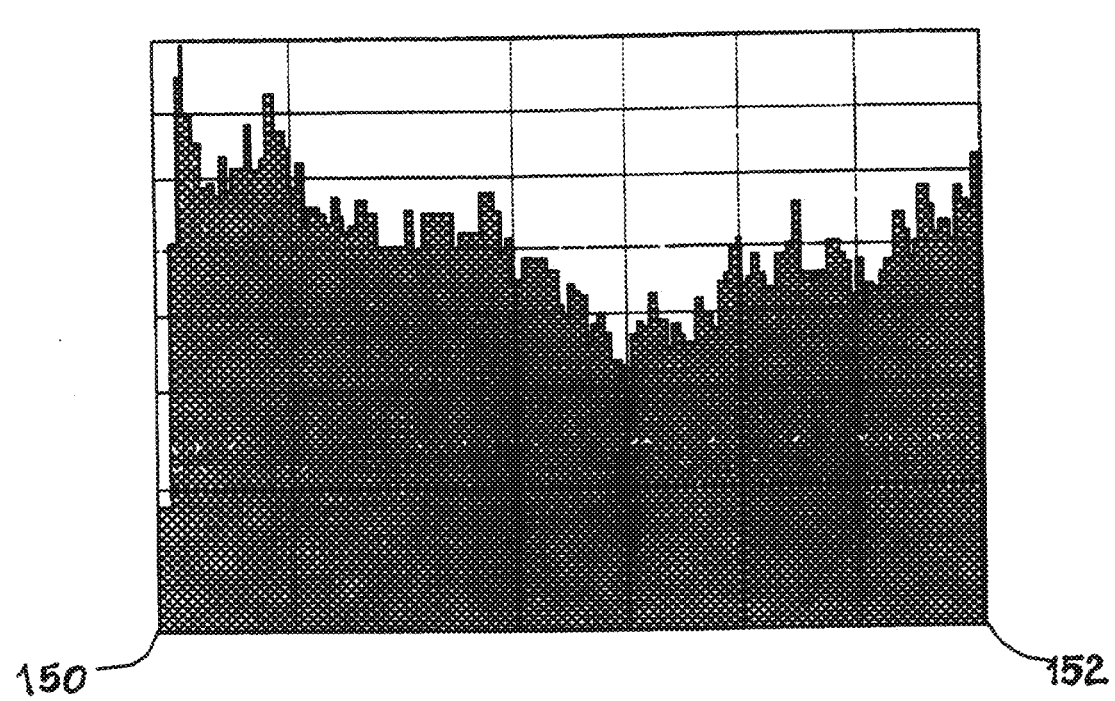
FIG. 7B is a histogram of the fruit surface corresponding to the image of FIG. 7A.

For the purposes of illustration, a typical scan line 148 is taken across one portion of the two hemispherical images in FIG. 7A. Scan line intensity is then depicted in the histogram of FIG. 7B where intensity is graphed against the vertical scale and positioned along the scan line along the horizontal scale with end 150 corresponding to the left end of the histogram of FIG. 7B and end 152 of scan line 148 corresponding to the right end of the histogram of FIG. 7B. A visual examination of the histogram of FIG. 7B indicates variations of pixel intensity maintained within a range of values with a fairly limited deviation from a mean, to provide a pattern quite different from the histograms depicted in FIGS. 8-14, wherein various fruit defects are illustrated. Through conventional statistical measures, the histograms can be characterized by meaningful statistical parameters, and through those parameters, sorted into categories to reliably identify the topographic surface texture of the fruit 114.

Figure 8:
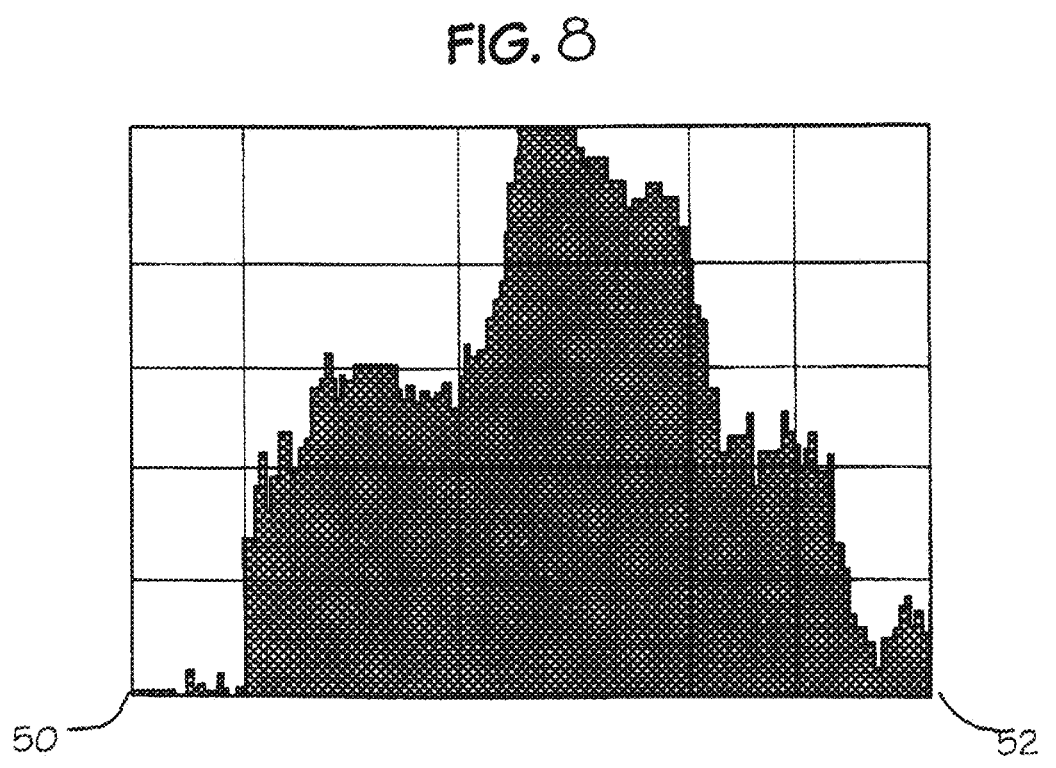
Figure 9:
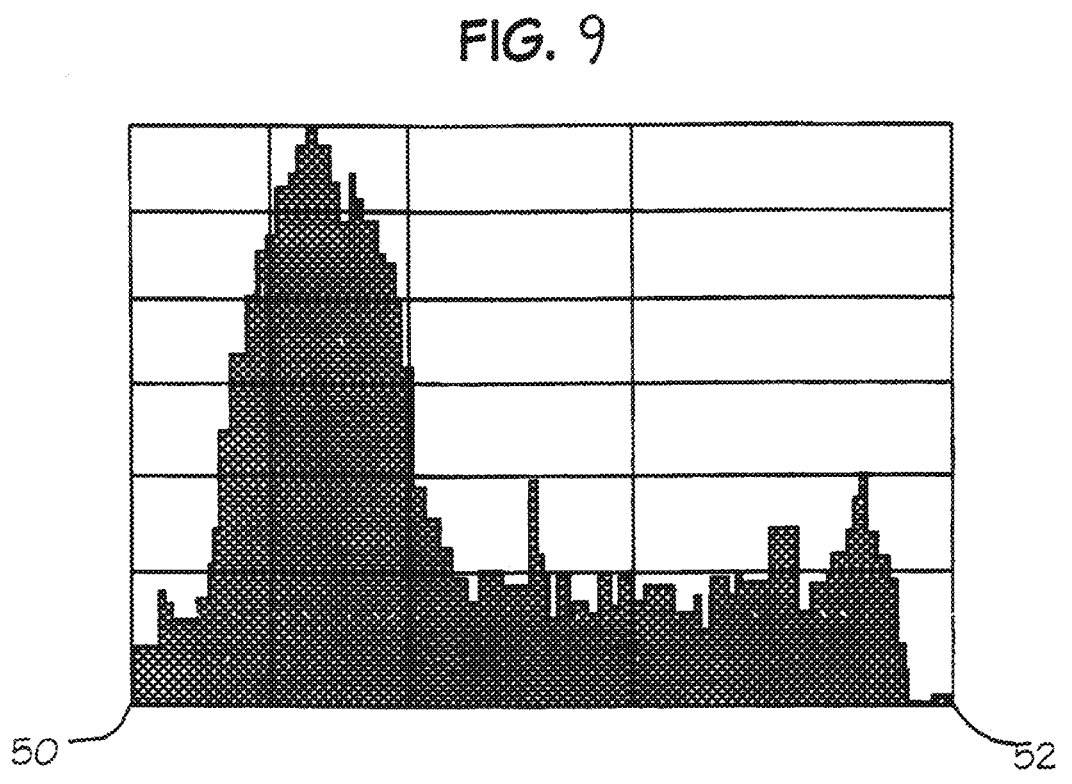
Figure 10:
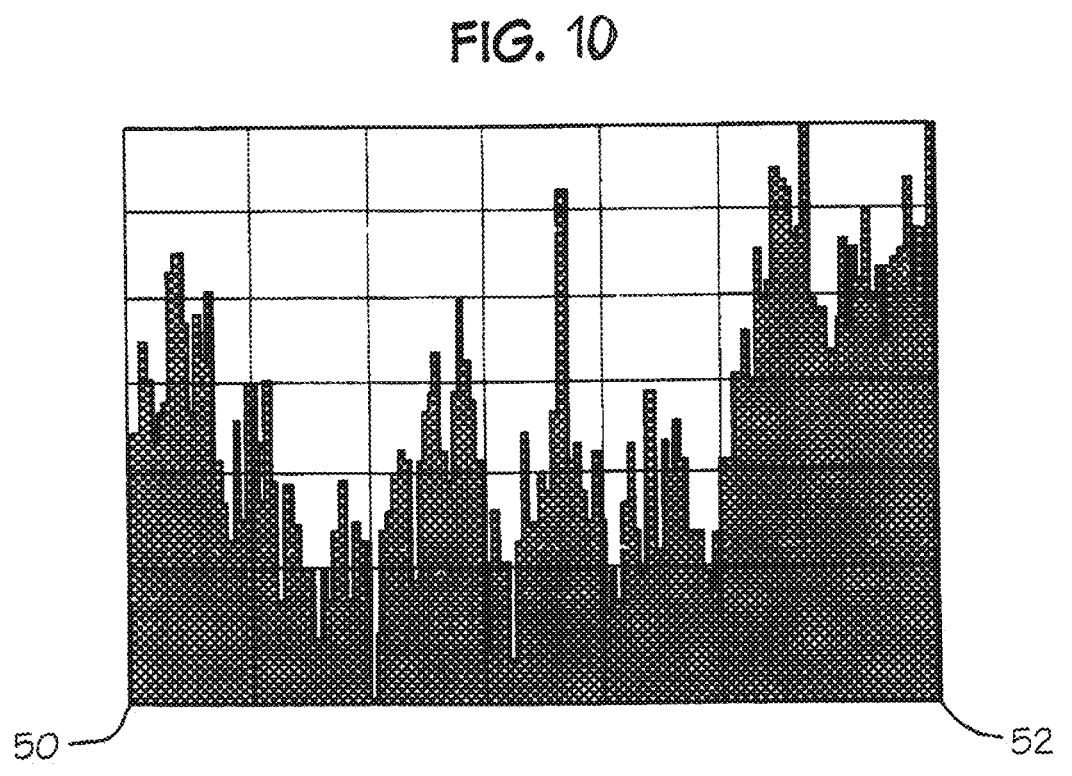
Figure 11:
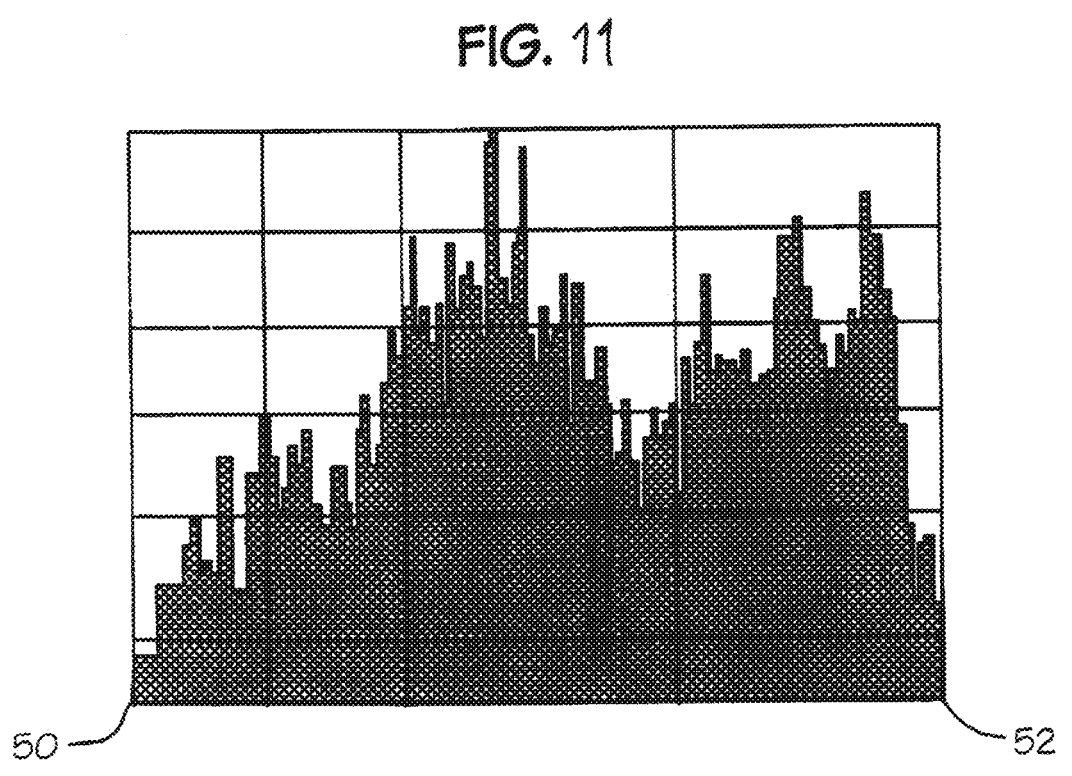
Figure 12:
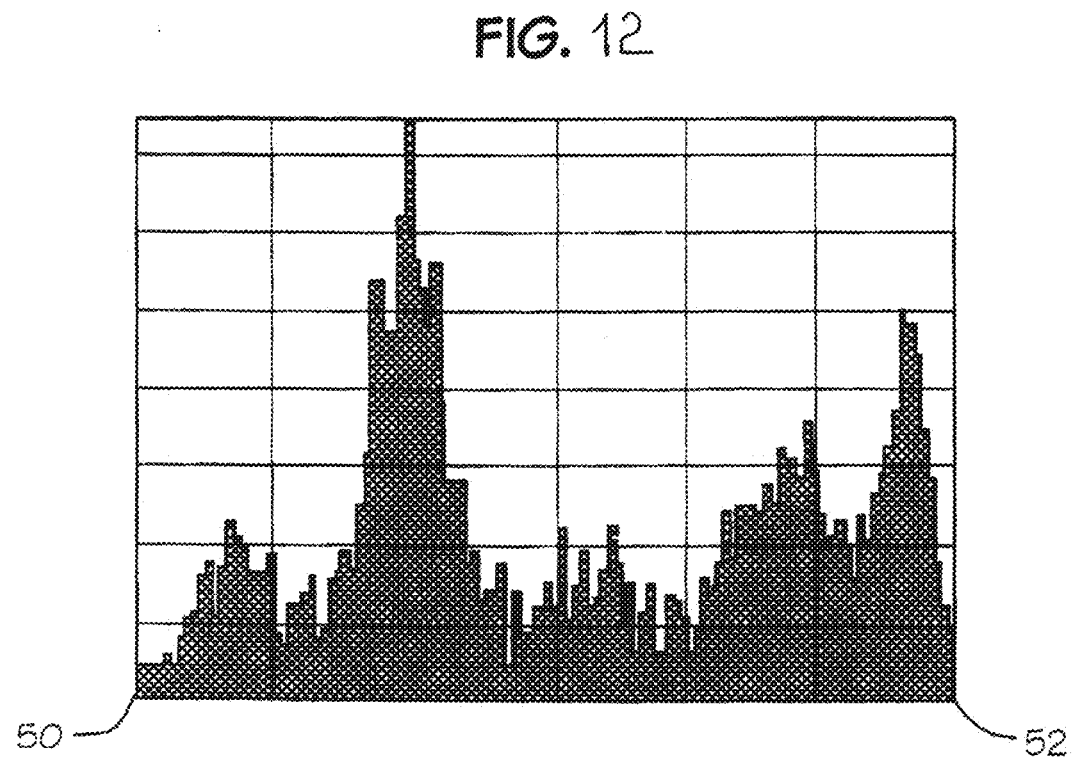
Figure 13:
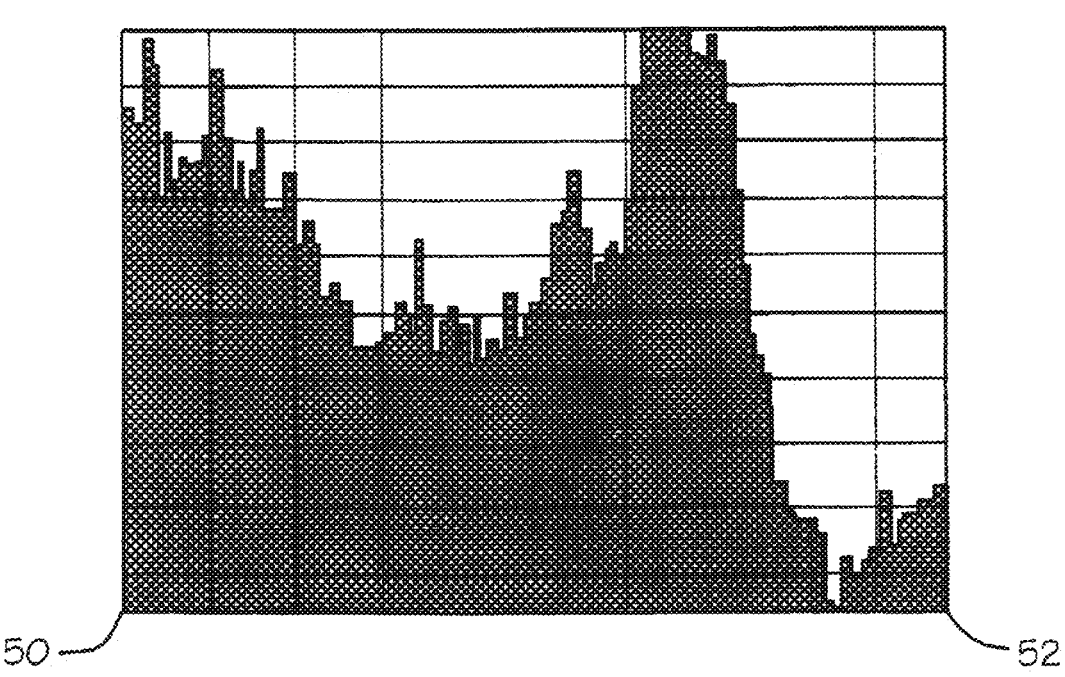
FIG. 13 is a histogram obtained from a fruit having a split or cut in the peel.
Figure 14:
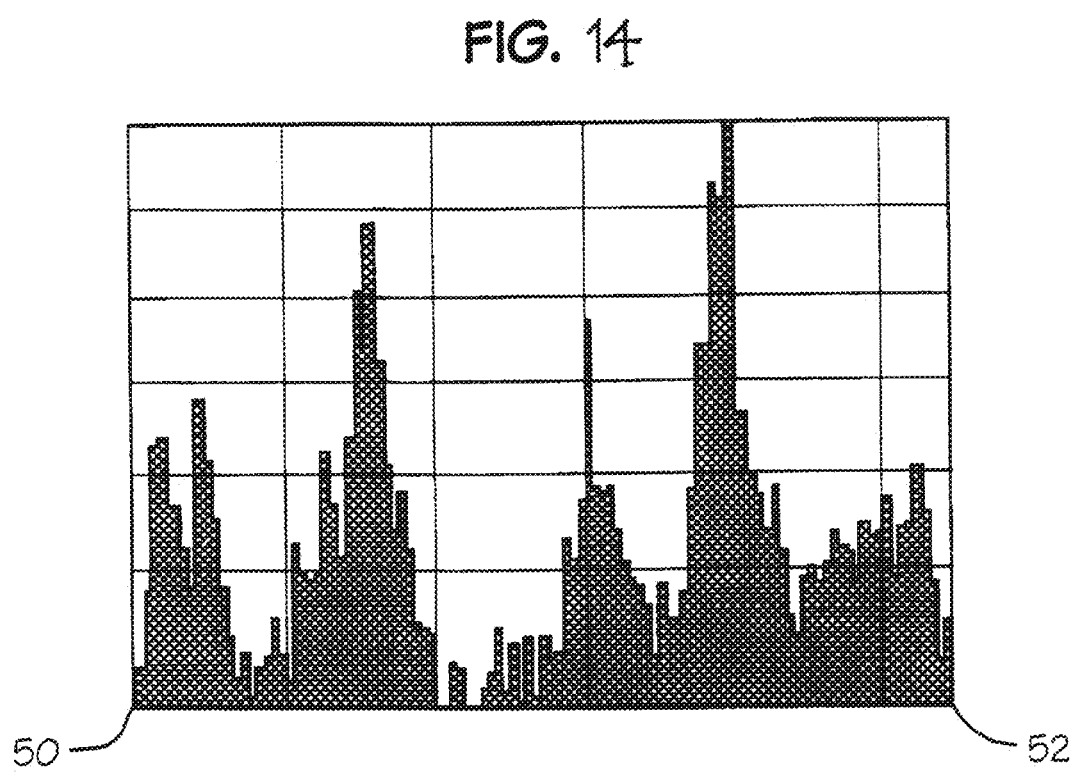

FIG. 8 depicts an intensity histogram taken from a computer image of a fruit 114 that is blemished by a surface decomposition known as sour rot. As compared to the histogram of FIG. 7B, there is a much wider variation between maxima and minima, and deviation from the mean is much greater than in the case of FIG. 7B. FIG. 9 depicts an intensity histogram taken from a computer image of a fruit 114 that is characterized by a clear rot skin blemish. The histogram shows a large peak sharply falling off to an average pixel intensity. FIG. 10 depicts an intensity histogram taken from a computer image of a fruit 114 that is characterized by high porosity or a pebbled surface that some consumers may dislike. FIG. 11 depicts an intensity histogram taken from a computer image of a fruit 114 whose surface is blemished by a condition known as soft puff and crease, and FIG. 12 is a histogram taken from a fruit 114 whose surface is blemished by a defect known as ridge and valley. FIG. 13 depicts a histogram taken from a fruit 114 with "fracture," which include splits, cuts, punctures, and scrapes. FIG. 14 depicts a histogram taken from a fruit 114 with a skin defect called clear puff and crease.

Each of the histograms described above may be saved in the memory of the machines as part of predefined conditions for characterizing the fruit. Upon taking a measurement from a newly received fruit, the machine 30 will subject it to the imaging test to produce an image similar to that disclosed in FIG. 7A and generate a histogram. The histogram will be then compared against the stored histograms that indicate certain conditions/defects to make a characterization.

Now, the process 70 of FIG. 3 can be explained in the context of the sorting machine 100. Sorting machines 100 may be placed in different facilities such as farms and orchards, possibly in different parts of the world. Each sorting machine 100 would initially be "trained" by its sets of data obtained from samples or an operator who runs a representative sample of fruits through the machine and provides input as to in which bin 142 each fruit in the sample should be placed. The sorting machine 100 develops its own set of parameter data based on the sample fruits and the inputs, and uses these parameter data to categorize the next fruit it encounters. More specifically, in step 71, the fruit is imaged as two hemispheres, in the manner shown in FIG. 7A, with a scan line 148 across one portion of the two hemispherical images. Scan line intensity is then depicted in a histogram, similarly to what is shown in FIG. 7B and FIGS. 8-14. In step 73, the machine compares the histogram of the current fruit against its internal parameter data. If there is a substantially close match between the histogram of the current fruit and one of the previously-generated histograms (step 75—"no"), the current fruit will be sorted or categorized into the same bin 142 as the previous fruit that generated the similar histogram (step 77). On the other hand, if the histogram of the current fruit does not resemble any of the previously generated histograms closely enough (step 75—"yes"), an alert is generated (step 79). To the system or to an operator, in response to the alert, the data is used to train and determine how the fruit should be categorized, and tells the machine 100 how it should be categorized (step 81). The machine 100 modifies or updates its internal parameter data with this new data (step 83) and categorizes the current fruit according to the operator input (step 77).

The machines 30, family of machines 50, and/or central processing units 20 initially receive the scan data and categorization data from selections of machines, and in some cases all the machines in the network (step 91), and generates its own central parameter data (step 93). The central parameter data may not be exactly the same as the local parameters on any one machine 100 since the machines 30 and or processing units 20 "see" more fruits than any single machine 100 in the network, and is presumably exposed to many more variations and conditions than any single machine 100. The central parameter data, thus, may be broader in the range of defects that are covered and able to distinguish defects with a higher resolution. The machine 30, family of machines 50, and/or the central processing units 20 also receives any external data (step 95). For example, the external data might be a request from a Department of Agriculture to report all cases of a specific condition, or local weather conditions.

The machine 30, family of machines 50, and/or central processing units 20 then identifies the machines 100 that they should receive data from and that should receive the updated/modified central parameter data (step 97). For example, if the update/modification to the parameter data pertains to a pebbliness of the fruit skin, this update would be sent to machines 100 whose primary function is to sort fruits to send to various grocery stores. However, the modified parameter data would not be sent to machines at a juicing factory because the texture of the fruit skin would not matter much to the juicing process, which typically happens after the skin is removed. At the same time, the machine 30, family of machines 50, and/or central processing units 20 also determines that all the machines 100 in the network should receive the request from the external data. The data and or parameters are then transmitted to the selected machines (step 99).

FIGS. 15-23 describe another example of the machine network 10, this example incorporating a threat detection machine 200. The threat detection system of the invention is useful for detecting the presence of various threatening items. A "threatening item" is any substance and or a combination of substances and items that may be of interest to a security system including but not limited to explosives, explosive devices, improvised explosive devices, chemical warfare agents, industrial and other chemicals that are deemed hazardous, biological agents, contraband, drugs, weapons, and radioactive materials. The threat detection machine 200 provides an automated system for performing different types of tests to screen multiple threatening items fast, such that multiple items can be examined in a relatively short period of time. Furthermore, the system of the invention decreases the reliance on human operators, using instead a computation unit that determines a risk factor based on concurrent acquisition and processing of the different test results. Thus, the system provides the much-needed method of increasing the accuracy of a security check test without compromising the throughput. Although the examples of FIGS. 15-23 focus on identification of "threatening item," it should be understood that the method and system disclosed herein may be adapted to identify any type of target item by defining the parameter and parameter data for the target item, regardless of whether the target item is threatening or not.

An "ionized radiation test," as used herein, is intended to include any form of test that emits ionized radiation such as nuclear, X-ray, or Gamma ray radiation. Examples of X ray methods include standard X-ray transmission, backscatter methods, dual or multi energy methods as well as CT-scan. Examples of nuclear radiation source testing include methods such as Thermal Neutron Analysis, Pulsed fast neutron analysis, backscatter, and terahertz test, among others. A "non-ionizing test" includes methods that use a non-ionizing electromagnetic (EM) radiation source, such as those that expose the material to a pulsed EM field and acquire the return pulse. These methods include use of high-millimeter waves, Nuclear Magnetic Resonance (NMR) spectroscopy, Electron Spin Resonance (ESR) and Nuclear Quadrapole Resonance (NQR), among others. An additional potential non-ionizing source includes Tetrahertz. In addition, "non-ionizing tests" also include methods used in detection of conductive materials that subject an item to electromagnetic fields, either constant or pulsed wave, and detect the corresponding direction of changes in the field. "Chemical analysis" is intended to include methods of substance detection including ion mobility spectrometry (IMS), ion trap mobility spectroscopy (ITMS), capture detection, chemiluminescence, gas chromatography/surface acoustic wave, thermoredox, spectroscopic methods, selective polymer sensors, and MEM based sensors, among others.

A "biological classification" classifies biological threats (e.g., organisms, molecules) according to guidelines indicating the potential hazard level associated with toxins, bioregulators, and epidemically dangerous organisms (such as viruses, bacteria, and fungi). A "biometric classification test" includes standard discrete biometric methods such as finger prints, as well as physio-behavioral parameters indicative of suspect behavior.

As used herein, "simultaneously" is intended to mean a partial or a complete temporal overlap between two or more events of the same or different durations. For example, if Event A begins at time 0 and ends at time 10 and Event B begins at time 2 and ends at time 10, Event A and Event B are occurring simultaneously. Likewise, Event C and Event D that both start at time 0 and end at time 7 are also occurring simultaneously. "Sequentially," on the other hand, indicates that there is no temporal overlap between two or more events. If Event E begins at time 0 and ends at time 6 and Event F begins at time 7 and ends at time 10, Events E and F are occurring sequentially.

A "threat determination function," as used herein, is intended to include a function or sets of functions that define a condition that indicates the presence of a threat. These function(s) can be a static value, sets of static values, or a dynamic calculation. The function(s) can be either rule-based or based on other methods such as neural network.

A "risk factor" indicates the likelihood that an item is a threatening item. A "set" of risk factors may include one or more risk factors.

Figure 15:
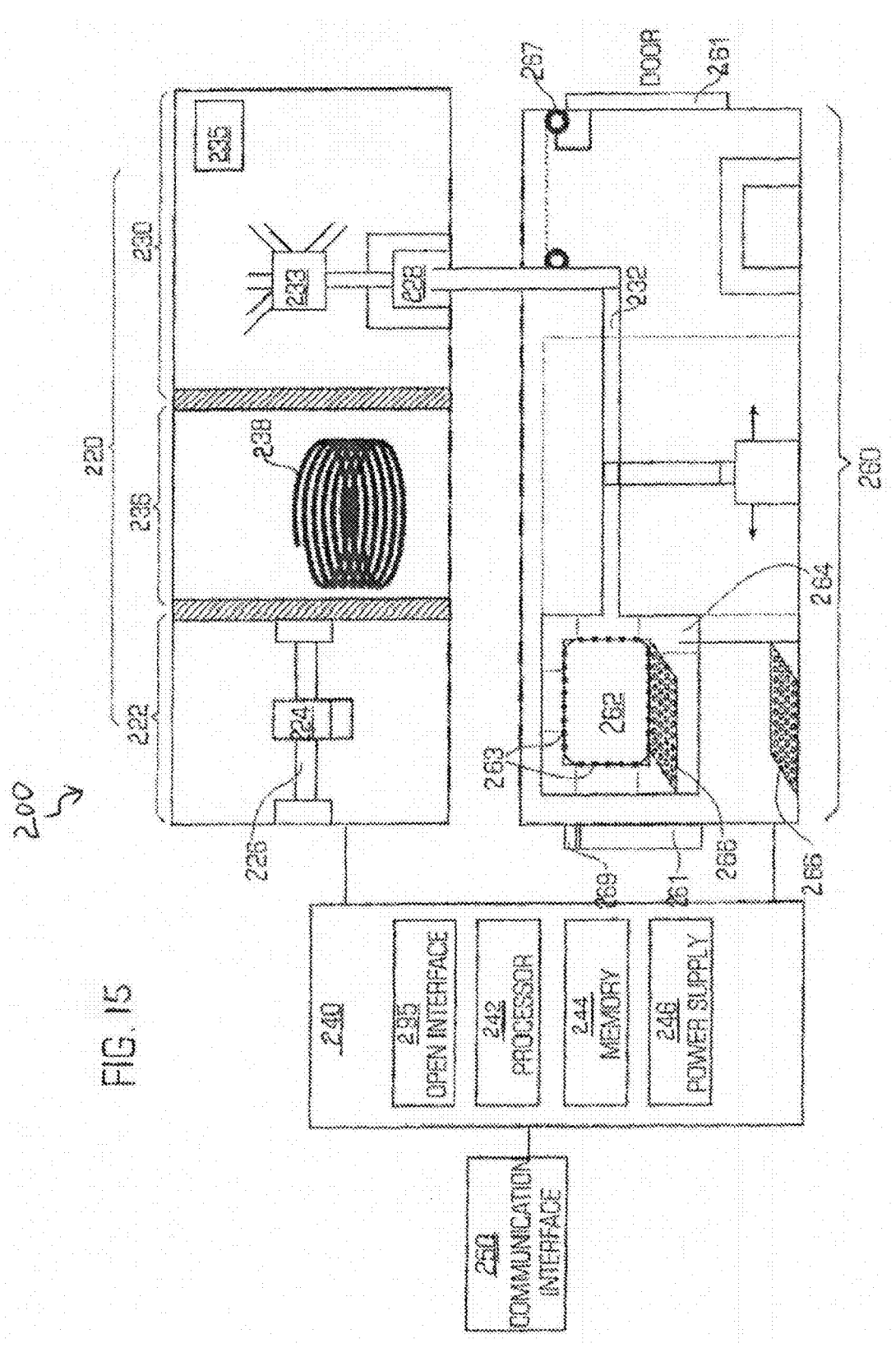
FIG. 15 is a block diagram of an exemplary embodiment of the threat detection system.

FIG. 15 depicts an embodiment of threat detection machine 200 that may be used in the machine network 10 instead of the sorting machine 100. The threat detection machine 200 may be, but is not limited to, a system such as what is described in U.S. Pat. No. 8,171,810 that may be useful at security check stations. As shown in FIG. 15, the threat detection machine 200 includes a test unit 220, a computation unit 240, and an object unit 260 that are coupled to one another. The object unit 260 has a mechanism that is designed to hold an object (e.g., a bag or a piece of luggage) that is being examined. The test unit 220 includes various test sources and/or equipment such as a radiation source for an X-ray exam, a chemical analysis unit for a chemical exam, RF coils and or other magnetic field inductions for a non-ionizing exam. The computation unit 240, which has a processor and a memory, is configured to receive inputs from the test unit 220 and the object unit 260 and process the inputs to generate a risk factor. The risk factor indicates the likelihood of the object unit 260 containing a threatening item. Optionally, there may be a communication unit that may include a user interface unit (not shown) that is coupled to the computation unit 240 so that the risk factor and a corresponding alert can be communicated to an operator of the threat detection machine.

The tests that are incorporated into the test unit 220 may be any currently known tests for screening threatening items, and is not limited to the examples mentioned herein. There may also be a plurality of object units coupled to the test unit 220 and the computation unit 240 so that multiple items can be examined almost at the same time.

The object unit 260 has one or more doors 261 through which an item 262 can be placed in the object unit 260 to be subjected to various tests. In some embodiments, the item 262 remains stationary on a platform in the object unit 260. In other embodiments, the item 262 is moved across the object unit 260 through a moving mechanism 267. The moving mechanism 267 may be coupled to a grasping and/or rotating mechanism 264, which may be a robotic mechanism that is capable of holding the item 262 and positioning and rotating the item 262 in a desired location at the desired test angle. In the embodiment shown, the moving mechanism 267 is a type of pulley system, an x-y positioner system 265, a linear motor, or any combination of these systems, and is coupled to the grasping and/or rotating mechanism 264. In an alternative embodiment, the moving mechanism may be a conveyor belt that carries the item 262 through different test stages.

The object unit 260 includes an automated receiver 269 that automatically provides extra information about the owner of the item 262. In some embodiments, the extra information may include ticketing information. In other embodiments, additional information about the owner, such as his name, citizenship, travel destination, etc. may also be made available by the automated receiver 269. The automated receiver 269 may be implemented with digital/magnetic tagging, RF tagging, or other smart card scan that identifies the owner/carrier of the item 262. This automatic correlation between the item 262 and its owner/carrier facilitates identifying the responsible person if a threatening item is found. The object unit 260 has one or more doors 261 through which the item can be removed. In some embodiments, the doors 261 are locked automatically upon the identification of a threatening item as part of the operational security protocols.

In this exemplary embodiment, the ionized radiation test unit 220 has an X-ray source subunit 222, a chemical analysis subunit 230, and non-ionizing source subunit 236. The X-ray examination is done by an X-ray source 224 generating a beam and directing it toward the item 262. The X-ray source 224 is preferably supported by a rotating mechanism 226 that allows the beam to be pointed in different directions, as it may be desirable to adjust the direction of the beam according to the size and the position of the item 262. A plurality of sensors 266 are located in the object unit 260 and positioned to receive the X-ray beams after they pass through the item 262. Additional sensors 266 can be positioned to acquire back scatter radiation as well. The beam is received by the sensors 266 after passing through the item 262. The sensors 266 generate output signals based on the received beam and feed the output signals to the computation unit 240. Where X-ray is used as one of the tests, the walls of the X-ray subunit 222 and the object unit 260 are shielded to contain the radiation within the object unit 260.

The chemical analysis may be performed by taking a sample from the item 262 and running the sample through the chemical analysis subunit 230. A path implemented by a flow device such as a rotational flow device 232 connects the grasping and/or rotating mechanism 264 to the chemical analysis subunit 230 so that the sample from the item 262 can be transported to the chemical analysis subunit 230. The chemical analysis may be based on, for example, ion mobility spectroscopy, or newer methods such as selective polymers or MEMs-based sensors. Where ion mobility spectroscopy is used, the chemical analysis subunit 230 includes an ionization reaction chamber 228. An air flow is generated by a vacuum pump 233 for obtaining a gas sample from the object unit 260. The gas sample travels through the adjustable closure pipes 232, which have particle acquisition pores 263 in proximity to the object 260 for obtaining gas samples. The rotational flow device 232 and the particle acquisition pores 263 provide a means for continuous-contact gas agitation and particle acquisition for continual analysis while the object moves inside the object unit 260 for other tests. The particle acquisition pores 263 may be placed on the grasping and/or rotating mechanism 264 that moves the item 262 across the object unit 260, such as the robotic arm or the conveyor belt mentioned above. The gas sample enters the chemical analysis subunit 230. In an exemplary embodiment using the IMS method, the gas sample enters an ionization reaction chamber 228 through the rotational flow device 232 and becomes ionized by an ionization source. The ionized gas molecules are led to a collector plate (not shown) located in the ionization reaction chamber 228 by an electric field within the chamber 228. The quantity of ions arriving at the collector plate as a function of time is measured and sent to the computation unit 240 in the form of one or more output signals. A microprocessor at the chemical analysis subunit 230 may convert the quantity of ions to a current before sending the current to the computation unit 240. IMS is a well-established method.

Optionally, the chemical analysis subunit 230 contains an interfacing module 235 to a biological detection system. If a biological detection system is incorporated into the test unit 220, a biological classification of the object can be obtained. A biological detection system that detects molecular materials could utilize one of the chemical analysis methods. A system that is intended to identify an organism, such as Anthrax, would utilize an automated DNA testing based on automated polymerase chain reaction (PCR) according to the current state of technology.

The non-ionizing source subunit 236 may contain a radiofrequency (RF) source and/or a magnetic source, such as RF coils 238 and antennae for NQR testing and/or eddy current testing. These tests provide information on the chemical compositions of the object and or information on the existence of metallic and other conductive materials. Magnetic sources may be a plurality of sources that vary in size and strength, so that the location of a threatening item can be detected as well as its presence. Radiofrequency waves and/or a magnetic field is directed at the item 262 and the sensors 266 receive the wave and/or the field after it passes through the item 262. For example, where the subunit 236 is a metal detector, the metal detector may transmit low-intensity magnetic fields that interrogate the item 262 as it passes through the magnetic fields. A transmitter generates the magnetic field that reacts with the metal objects in its field and the sensors 266 measure the response from this reaction. The sensors 266 send the measurement result to the computation unit 240.

In addition to the X-ray exam, ion mobility spectrometry, and the non-ionizing source test used in the embodiment of FIG. 15, any other test may be employed by the threat detection system 200 if considered useful for the particular application. Also, the X-ray exam, the ion mobility spectrometry, and the non-ionizing source test may be substituted by different tests as deemed fit by a person skilled in the art. Preferably, each of the subunits 222, 230, 236 is designed to be replaceable independent of other subunits. Thus, substituting one test with another will likely be a matter of replacing one subunit with another.

The sensors 266 may be a fused-array sensor capable of collecting multiple information either in parallel or in a multiplexed manner. Information collected may include any test results such as X-ray, terahertz ray, gamma ray, RF, chemical, nuclear radiation, and current information.

The computation unit 240 includes a processor 242, a memory 244, and a power supply 246. Using a multi-variant method such as the method described below in reference to FIG. 16, the computation unit 240 determines the risk factor, which indicates the likelihood that an object will contain a threatening item. The computation unit 240 has a communication interface 250 through which it can send visual and/or audio alerts in any mode of communication, preferably wirelessly, if an item is likely to contain a threatening item. There is also at least one open interface 295 that allows the computation unit 240 to communicate with another apparatus, such as a platform for human portal system or a platform for biometric inputs. The open interface 295 may allow wired or wireless connections to these other apparatuses.

The chemical analysis test results may be sent directly from the collector plate in the chemical analysis subunit 230 to the computation unit 240. If desired, however, the data from the collector plate may be sent to one or more sensors 266 in the object unit 260 and sent to the computation unit 240 indirectly from the sensors 266. When using other methods such as passive sensors, particles can be routed directly to sensors 266. Other data, such as X-ray data, are collected by the sensors 266 and sent to the computation unit 240. As used herein, "sensors" include any type of device that is capable of making a physical or electrical measurement and generating an output signal for the computation unit 240, such as sensors 266 in the object unit 220 and the collector plate in the chemical analysis subunit 230.

Although FIG. 15 shows the test unit 220, the computation unit 240, and the object unit 260 as three separate components, the division is conceptual and the physical units do not necessarily have to correlate with the conceptual division. For example, all three units may be contained in one housing, or the test unit 220 and the object unit 260 may be contained in the same housing while the computation unit 240 is in a remote location.

Figure 16:
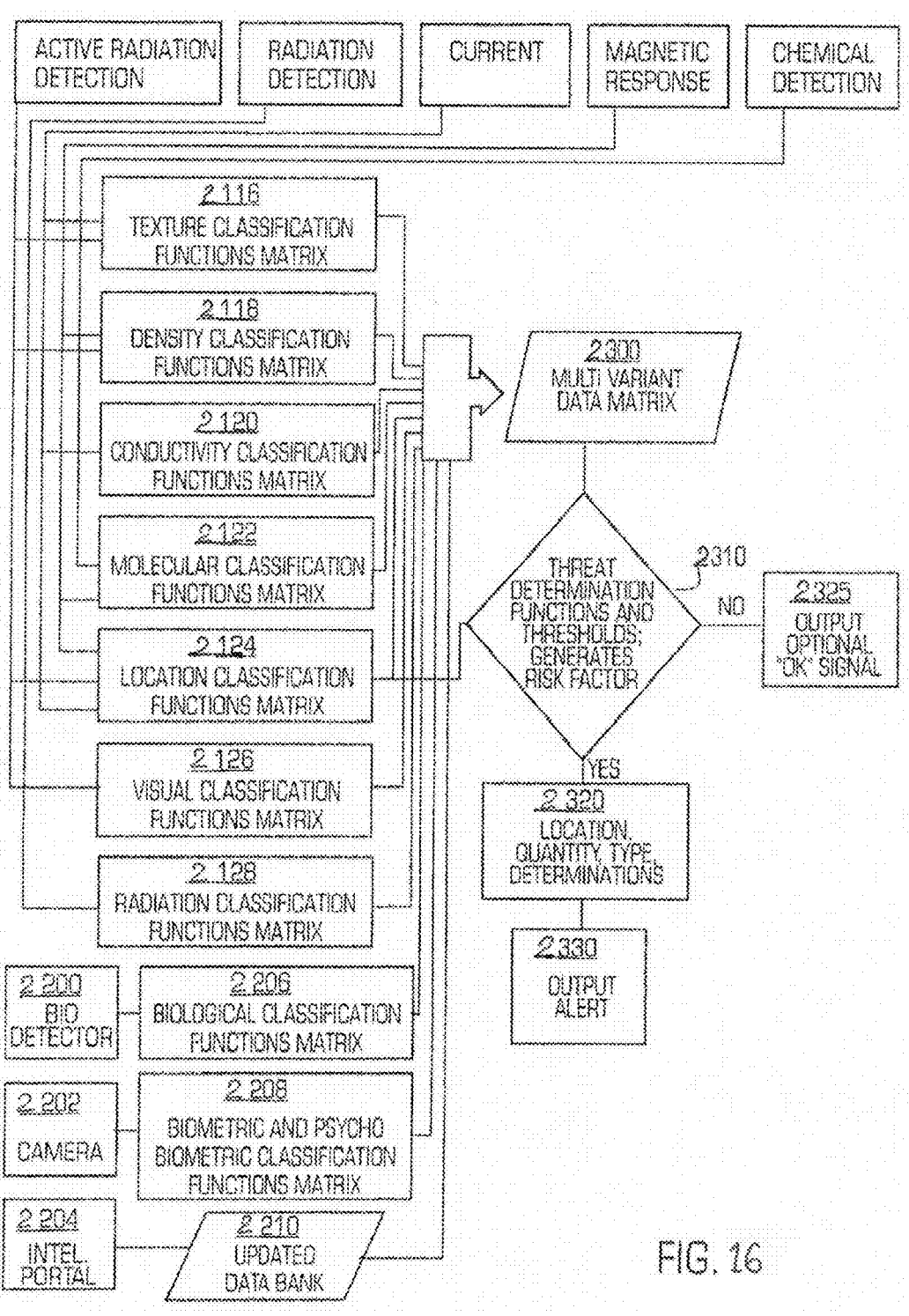
FIG. 16 is a block diagram illustrating the modules of the computation unit for executing a threatening item identification method.

FIG. 16 is a block diagram illustrating the modules of the computation unit 240 for executing a threatening item identification method. As described above, the computation unit 240 receives inputs from the test unit 220 and/or the object unit 260. These inputs originate as raw data collected by the sensors 266 and/or the collector plate in ion mobility spectrometry (or another chemical sensor). As shown in the diagram, the method uses a set of functional modules 2116, 2118, 2120, 2122, 2124, 2126, 2128, 2206, 2208 to process the various inputs from the sensors 266 and the sensor in the test unit 220 (e.g., the collector plate). Using these modules, values are calculated for various parameters such as texture, density, electrical conductivity, molecular classification, location classification, radiation classification, visual classification, biological classification, and biometric classification for the item 262. Where the item 262 is something like a bag that contains multiple components, the components may be automatically divided according to texture, density, conductivity, etc. so that each component is classified separately.

In the particular embodiment of the threatening item identification method that is shown in FIG. 16, the active radiation (e.g., X-ray) detection results are used for determination of texture classification, density classification, shape context classification, location classification, and visual classification. The radioactive level of the object may be determined for radiation classification. Current data or induced EM field responses are used for parameter data for texture classification, conductivity classification, and location classification. The magnetic response is used for determining parameter data for molecular classification, density classification, and location classification. Any chemical analysis result is used for molecular classification. Output signals from the sensors 266 and output signals from the chemical analysis subunit 230 are fed to the different modules in parallel, so that the values for all the parameters of the classification areas such as texture, density, etc. can be determined substantially simultaneously.

After the parameters based on values and functions for each of these classification areas is determined, the values are collectively processed in a multi-variant data matrix module 2300 to generate a risk factor. The multi-variant data matrix 2300 arranges the plurality of classification parameters from function matrices 2116, 2118, 2120, 2122, 2124, 2126, 2128, 2206, 2208, 2210 into an n-dimensional data matrix. For instance, visual classification function matrix 2124 would yield numerous visualization data [V] as a function of number of $(1 \ldots n)$ and measurement and angles $(\Phi)$ depending on the number of rotations performed by the grasping and/or rotating mechanism 64, so one form of data would be $V=f(\Phi)n$. Additionally, a series of visualization data [V] related to density parameters [D] at each angle $\Phi$ would yield the set of parameters $V=f(D, \Phi, n)$. Another set of parameters fed into the multi-variant data matrix 2300 would be conductivity classifications from the conductivity classification functions matrix 2120 and would similarly yield an array of interrelated parameters, for example conductivity [Z] as having varying intensities (i) as a function of location (l) yielding one set of $Z=f(i,l)$. These three exemplary functions $V=f(\Phi, n)$, $V=f(D, \Phi, n)$, and $Z=f(i,l)$ would be arranged in the multi variant data matrix 2300 in such a way that provides multiple attributes for particular three-dimensional locations, as well as global attributes, throughout the screened item. More generally, all classification function matrix blocks will produce numerous parameter sets, so that an n-dimensional parameter matrix is produced for processing in block 2310.

The n-dimensional parameter matrix generated in block 2310 enables numerous calculations and processing of dependent and interdependent parameters to be performed in block 2310. The parameters from the multi-variant data matrix module 2300 is submitted to the threat determination functions, which include running sets of hybrid calculations. Hybrid calculations include combinations of rule-based and other methods (such as neural network or other artificial intelligence (AI)-based algorithms) and comparison of the result against real-world knowledge criteria and conditions (block 2310). In some embodiments, an example of a rule-based decision would combine testing some or all of the parameter(s) against thresholds. For example, a condition such as "If texture classification $T(\Phi,L)n>3$, density classification $D(\Phi,L)n>4$, conductivity classification $Z(i,l)n>4$, location classification$>3$, and radiation classification$>1$" could be used as a condition for determining one type of risk factor and possibly generating an alert. Calculations may be any simple or complex combination of the individual parameter values calculated by test block 2310 to determine sets of risk factors. Sets of risk factors represent various categories of threats that are likely to be present in the object. For instance, there may be a category of threat functions associated with the likelihood of a biological event which would produce a risk factor for this category, there may also be a category of threat functions associated with the likelihood of an explosive threat which would produce a risk factor for the explosive category, and yet there may be a category threat functions associated with a general likelihood evoked by a combination of attributes not necessarily specifically to the material type. Different calculations may yield a number of risk factors within each category. The threat functions include test conditions and apply criteria based on pre-existing real world knowledge on signals and combinations of signals identifying threats.

If a high-enough risk factor is determined that the preset set of threat thresholds are satisfied, depending on the embodiment, the location, quantity, and type of the threatening item may be estimated (block 2320), an alert may also be generated (block 2330). Whether a risk factor is high enough to trigger the alert depends on the sensitivity settings within the system, which has a default setting and is reconfigurable by the user. An "alert" may include a visual or audio signal for notifying the operator that a threatening item may have been identified, and may also include taking other operational actions such as closure/locking of the door 261 in the object unit 260. Optionally, a signal (e.g., a green light) may be generated to indicate that an object is clear of threatening items (block 2325).

Figures 17, 18:
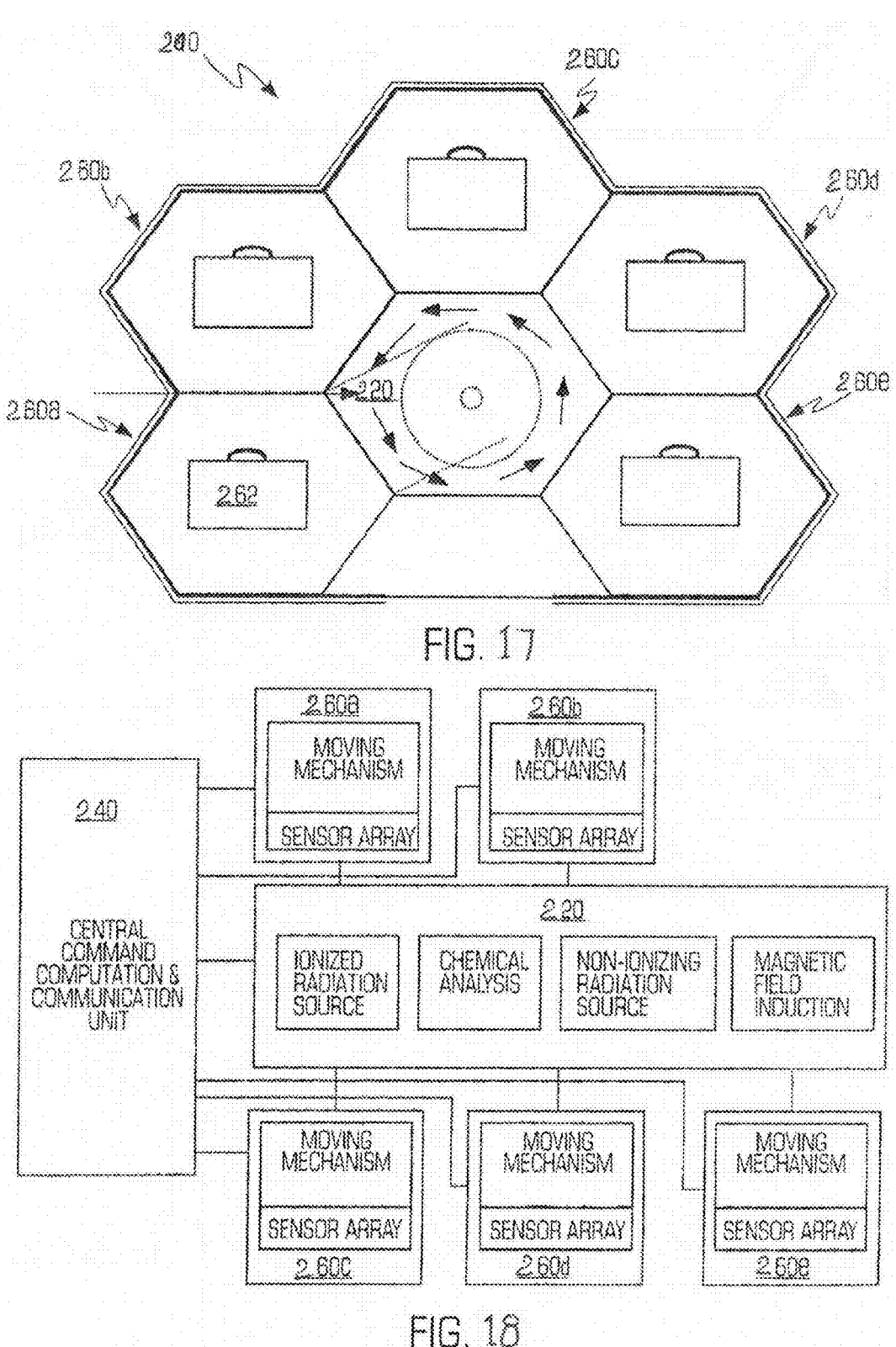
FIG. 17 is an exemplary embodiment of the threat detection system including a single test unit and multiple object units.
FIG. 18 is a block diagram showing the test unit and the object units.
Figure 21:
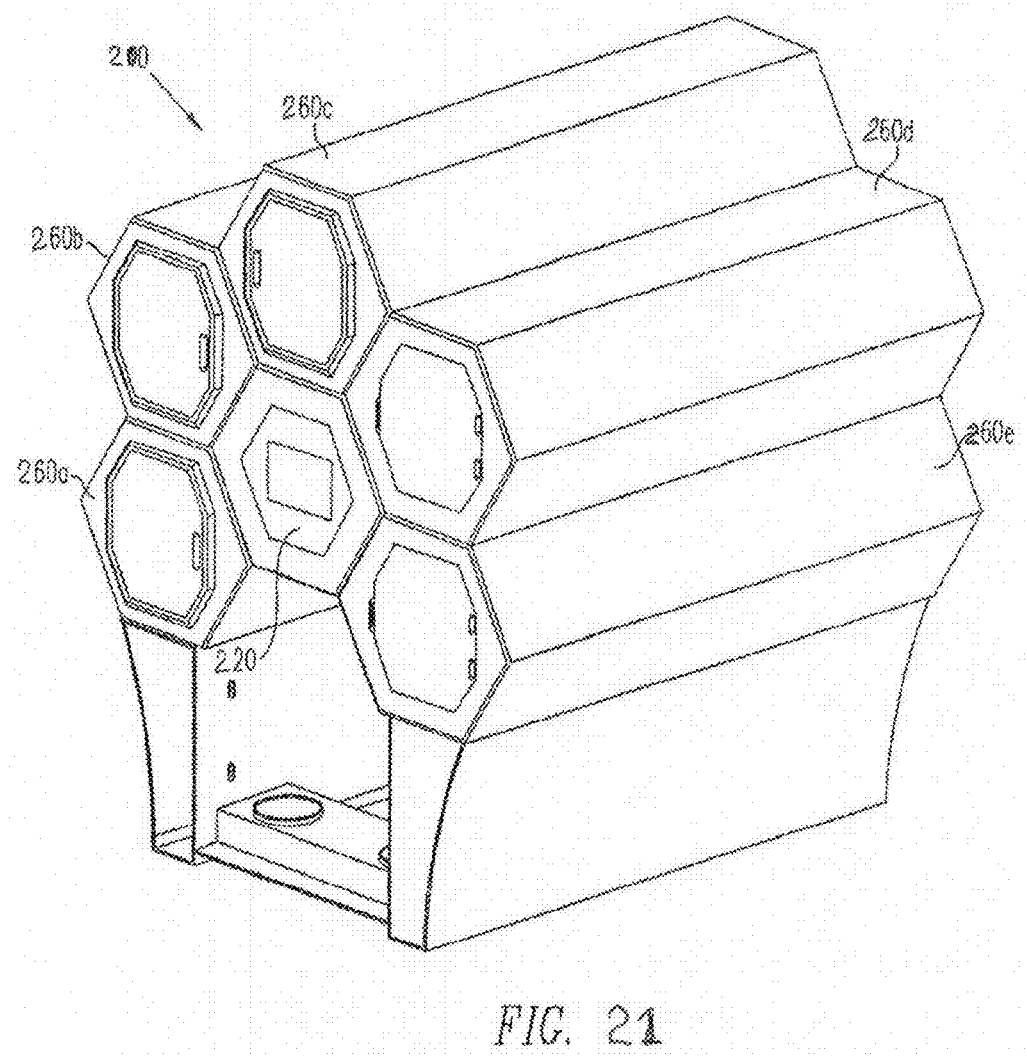
FIG. 21 is a perspective view of an exemplary embodiment of the threat detection system including a single test unit and multiple object units.

FIG. 17 is a cross-sectional view of an exemplary embodiment of the threat detection machine 200 including a single test unit 220 and multiple object units 260a-260e. FIG. 21 is a perspective view of the threat detection machine 200. In this embodiment, the centrally located test unit 220 has flat outer surfaces that interface the object units 260a-260e. As shown, the test unit 220 is located centrally with respect to the object units 260 so that an object can be tested by the test unit 220 regardless of which object unit it is in. The test unit 220 and the object unit 260 may be made of any material with structural integrity including various metals (e.g., steel) or composite material. Preferably, there is a rotating mechanism in the test unit 220 that allows the direction of the test beam, etc. to be adjusted depending on which object is being tested. Once all the object units are filled, the test unit performs tests on the objects by turning incrementally between each object unit 260 as shown by the arrows. Some tests are performed sequentially. For example, if an X-ray test is performed, the X-ray beam is directed from the test unit 220 to the multiple object units 260a-260e sequentially, e.g. in a predetermined order. However, other tests are performed simultaneously for the multiple object units 260a-260e. For example, if a chemical analysis test is performed, a sample of each object in the multiple object units 260a-260e can be taken simultaneously, as each object unit has its own rotation flow device 232, grasping and/or rotating mechanism 264, and particle acquisition pores 263. Thus, depending on the tests that are included in the particular embodiment, the overall testing may be partly sequential and partly simultaneous for the multiple object units 260a-260e. All the test data are sent to the computation unit 240, preferably as soon as they are obtained.

The output signals from the sensors 266 (and the collector plate of the chemical analysis subunit 230, if applicable) may be processed by a single computation unit 240 or a plurality of computation units 240. Where a single computation unit 240 is used, the computation unit 240 keeps the items separate so that it yields five different results, one for each item 262.

The embodiment of FIG. 17 allows multiple items to be processed quickly compared to the current security check system where passengers form a single line and one object (e.g., bag) is processed at a time. Therefore, all the tests incorporated into the test unit 220 can be performed for each of the items in the object units 260a-260e without compromising the traffic flow.

The threat detection machine 200 of FIG. 17 may be designed as a modular unit, so that the number of object units 260 is adjustable. Thus, if a first area is getting heavy traffic while traffic in a second area has slowed down, a few of the object units from the second area can be used for the first area by simply being detached from one test unit 220 and being attached to another test unit 220. The detaching-and-attaching mechanism may use hook systems and/or a clasping/grasping/latching mechanism. This flexibility results in additional cost savings for public entities that would use the threat detection machine 200. The object units 260a-260e are substantially identical to one other.

Additionally, the platform on which the item 262 is placed in the object unit 260 may have a sensor, such as a weight or optical sensor, that signals to the test unit 220 whether the particular object unit 260 is in use or not. So, if only object units 260a, 260b, 260d, and 260e are used for some reason, the test unit 220 will not waste time sending test beams and collecting samples from the empty object unit 260c and the system 10 will automatically optimize its testing protocols. The threat detection machine 200 may include a processor for making this type of determination. A sensor is placed either in each object unit 260 or in the test unit 220 to detect an output signal indicating that an item in the object unit 260 has been tested.

Figure 22:
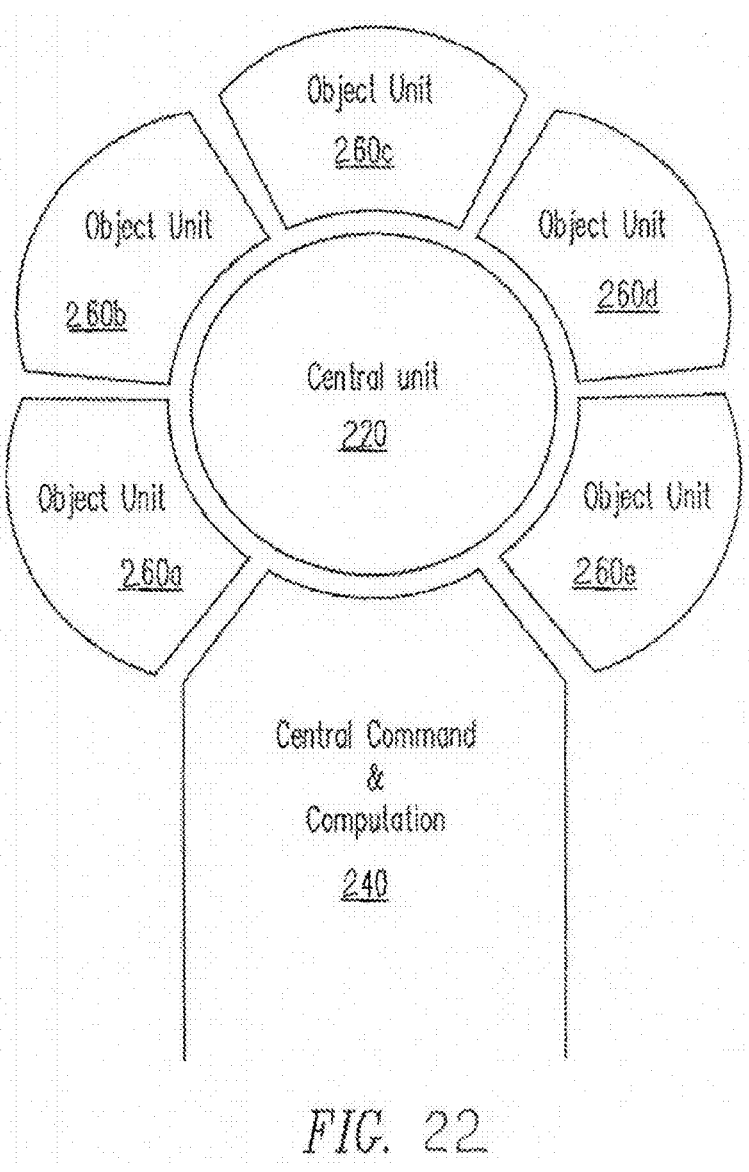
FIG. 22 is a cross-sectional view of an alternative embodiment of the threat detection system wherein the central unit has a curved outer surface.

Although the particular embodiment shows the units as having hexagonal shapes for a honeycomb configuration, this is just an example and not a limitation. For example, the test unit 220 may have any polygonal or curved cross section other than a hexagon. FIG. 22, for example, shows a cross-sectional view of a threat detection system 200 wherein the test unit 220 has a curved outer surface (as opposed to flat outer surfaces as in the embodiment of FIG. 17). The shapes of the object units 260a-260e are adapted so they can efficiently and securely latch onto the test unit 220. Furthermore, the structure allows a resource in a central unit (e.g., the test unit 220) to be shared among the surrounding compartments (e.g., object units 260) in a fast and space-efficient manner, making the structure useful for various applications other than detection of threatening items. For example, where multiple items need to be encoded with a piece of data, the data source can be placed in the central unit so that items in the surrounding compartments can read the data. In a case of laser etching, items in the compartments could receive data encoding from the central unit.

FIG. 18 is a block diagram showing the test unit 220 and the object units 260a-260e. In the particular embodiment, a single computation unit 240 is used for all the object units 260a-260e. Each of the object units 260a-260e contains a moving device, such as a mechanical mechanism, multi axis manipulator, robotic mechanism, a conveyor belt, or any other rotating and linear mechanism and a sensor array, as described above in reference to FIG. 15. The moving device allows both linear and rotational movement. The test unit 220 has four subunits: an ionized radiation source subunit, a chemical analysis subunit, a non-ionizing radiation source subunit, and a magnetic field induction subunit. Each of the object units 260a-260e is coupled to the test unit 220 and the computation unit 240.

Figure 19:
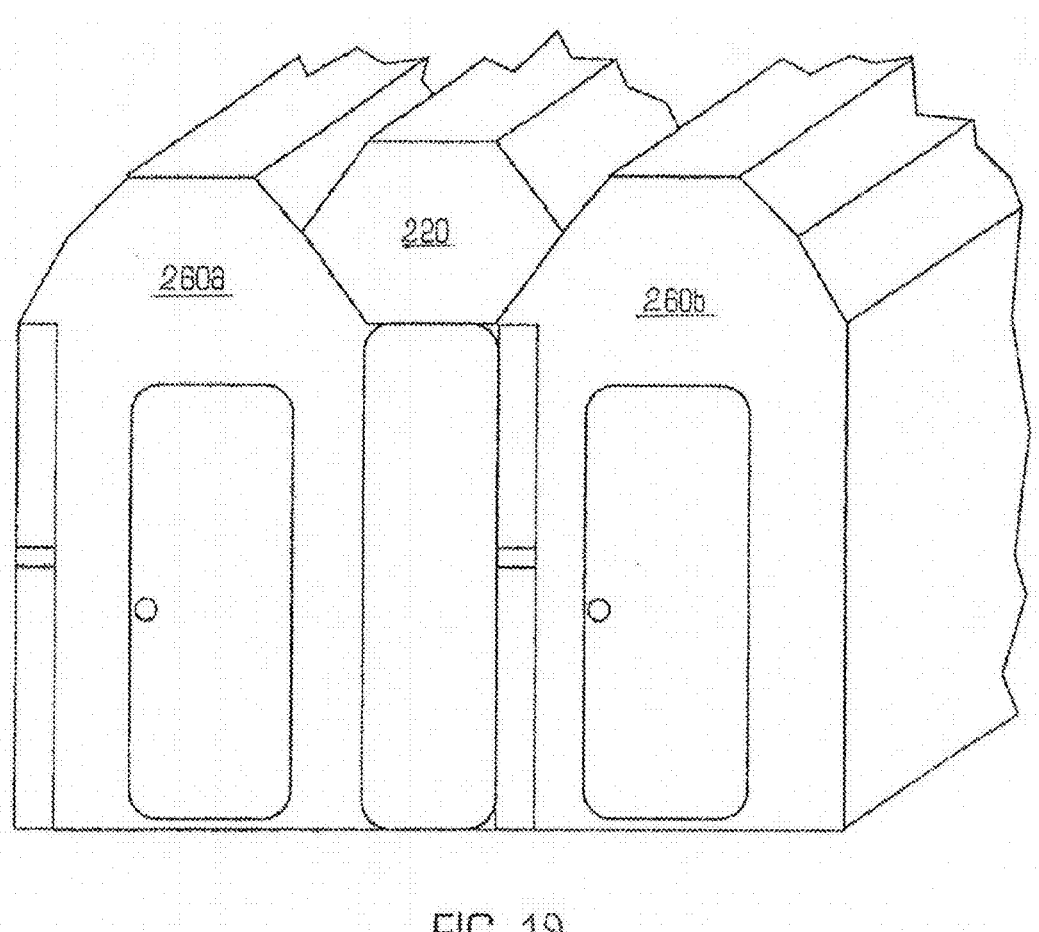
FIG. 19 is another exemplary embodiment of the threat detection system wherein the object is a human being (or any of other animals).

FIG. 19 is another exemplary embodiment of the threat detection system 200 wherein the item is a human being (or any of other animals). In the particular embodiment that is shown, the test unit 220 has two object units 260a, 260b attached to it. Naturally, tests involving radiation will be used with caution, by choosing appropriate radiation sources and parameters when the "items" being tested are human beings. If desired, a camera may be installed somewhere in the test unit 220 or the object unit 260a and/or 260b to obtain images of objects in order to obtain a biometric classification and/or transmit images to an operator.

Figure 20:
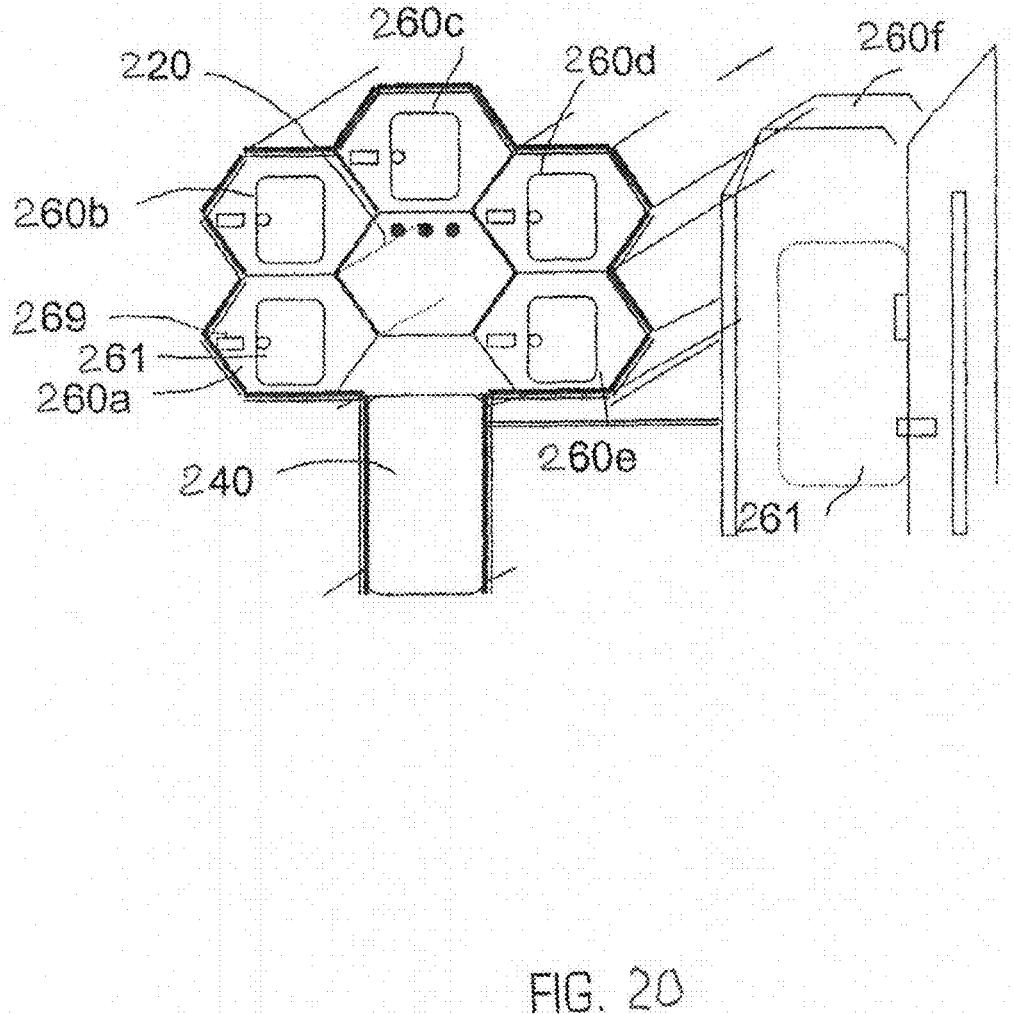
FIG. 20 is yet another exemplary embodiment of the threat detection system for testing inanimate objects and human beings.

FIG. 20 is yet another exemplary embodiment of the threat detection machine 200 for testing inanimate items and human beings. The particular embodiment has the test unit 220 with five object units 260*a*-260*e* for testing inanimate items and a portal 260*f* for human beings or animals to pass through. The test unit 220 tests items in the object units 260*a*-260*e* and human beings in the object unit 260*f* that are in each of the object units 260*a*-260*f*. However, all the object units and both test units would still feed signals to a single computation unit 240.

Figure 23:
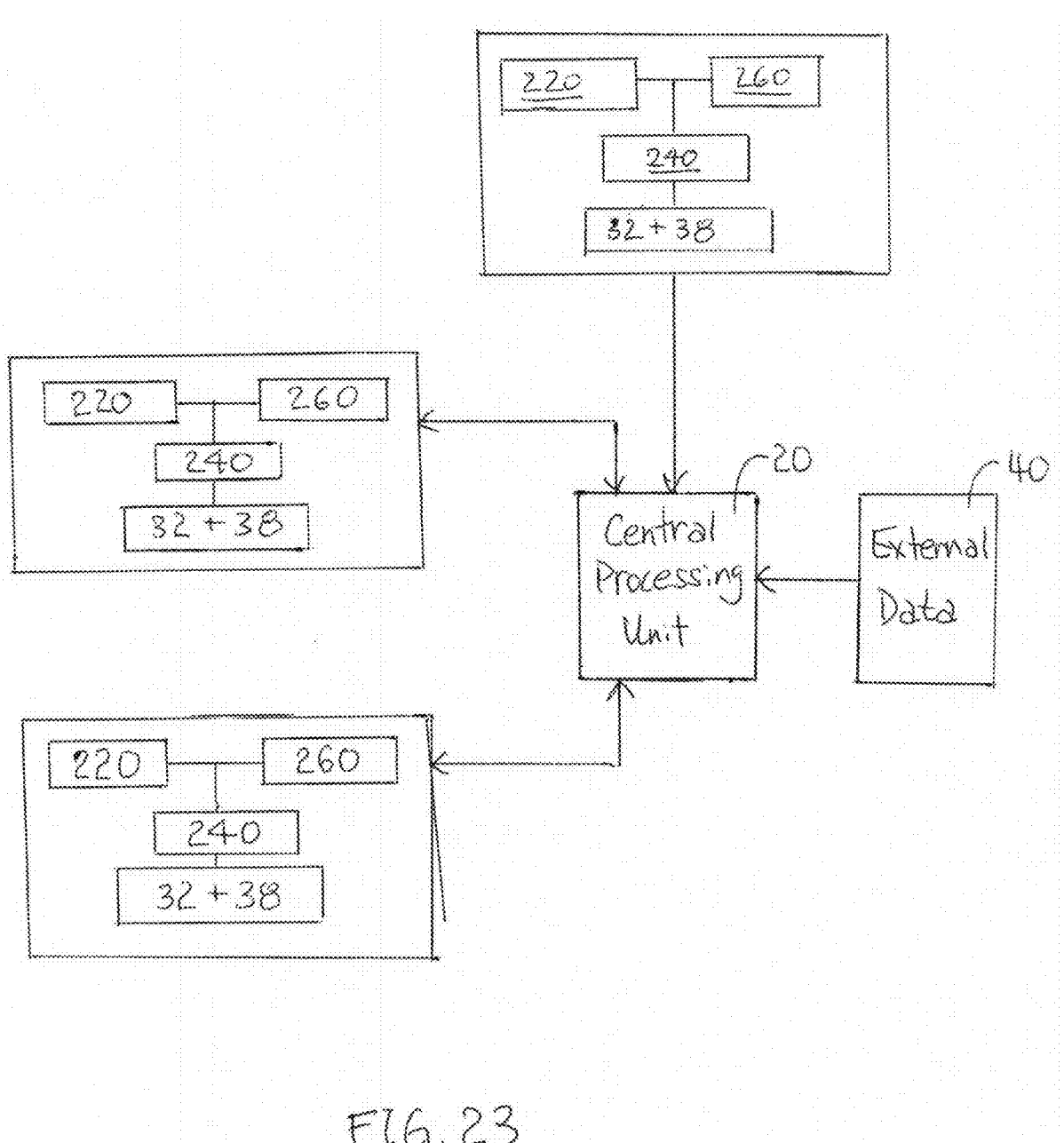
FIG. 23 depicts an example embodiment of a machine network where each machine is a threat detection machine.

FIG. 23 depicts an embodiment of the machine network 10 where each machine 30 includes a threat detection machine 200. Similarly to the network of sorting machine 100 illustrated in FIG. 4, the threat detection machine 200 of the network in FIG. 23 is enhanced with the processing unit 32+38 to include artificial intelligence and internal parameter data. The computation unit 240 of a threat detection machine 200 in the network communicates with the processing module 32 that employs artificial intelligence and a memory 38 that stores internal parameter data. The measurement unit 34+36 of the machine 30 in FIG. 23 would include the test unit 220, and the object unit 260 would receive objects/items to be characterized.

A single, free-standing threat detection machine 200 allows detection of threatening items with increased accuracy compared to the currently available system. Unlike systems that use a sequence of separate equipment, with each equipment using only one test and generating a test result based only on that one test, the system relies on a combination of a plurality of parameters. Thus, while a bomb that has a low level of explosive and a small amount of conductive material may escape detection by the current system because both materials are present in amounts below the threshold levels as measured by separate tests, the item could be caught by the threat detection machine 200 because the presence of a certain combination of indicative materials and vicinity parameters included in the threat determination functions could trigger an alarm. The use of combinations of parameters allows greater flexibility and increased accuracy in detecting the presence of threatening items.

Adding the network element to the threat detection machine 200 takes the level of threat detection accuracy even higher. With a single, free-standing threat detection machine 200, two components that are dangerous only when combined may still pass undetected if the two components are not placed through the same threat detection machine 200. In a large stadium or venue that hosts thousands of people, putting all the people through a single threat detection machine 200 would slow down the entry process too much. When there are multiple entrances into a venue, the machine network 10 allows a threat detection machine 200 to be positioned at each entrance and communicate with one another. So, if Bad Guy A enters through the front entrance carrying component A and Bad Guy B enters through the side entrance carrying component B that would raise alarm only if combined with component A, the threat detection machines 200 at the two entrances can communicate each other through the network and note that components A and B have been detected going into the same venue.

As the machine network 10 is not limited to being within a certain distance, the threat detection capability can be extended beyond a single venue to a jurisdiction of any size, such as a city or any larger geographic area. In one embodiment, the central processing unit 20 is "watching" and processing all the data passing through the machines 30 in the machine network 10. Upon noticing any unusual activity, whether it be based on items that are passing through the threat detection machines 200 in the network 10, identities of individuals, or any combination of such data, an alert may be generated.

The machine network 10 allows different types of machines to work as a "team." This is different from the single, free-standing machine that looks for specific items/materials such as explosives, drugs, weapons, etc. being carried by one individual. By detecting an unusual pattern or the presence of a general combination of potentially hazardous materials/conditions, the machine network 10 enables detection of a potentially dangerous situation/devices effectively.

Various embodiments of the processing units may be implemented with or involve one or more computer systems. The computer system is not intended to suggest any limitation as to the scope of use or functionality of described embodiments. The computer system includes at least one processor and memory. The processor executes computer-executable instructions and may be a real or a virtual processor. The computer system may include a multi-processing system which includes multiple processing units for executing computer-executable instructions to increase processing power. The memory may be volatile memory (e.g., registers, cache, random access memory (RAM)), non-volatile memory (e.g., read only memory (ROM), electrically erasable programmable read only memory (EE-PROM), flash memory, etc.), or combination thereof. In an embodiment of the present disclosure, the memory may store software for implementing various embodiments of the disclosed concept.

Further, the computing device may include components such as memory/storage, one or more input devices, one or more output devices, and one or more communication connections. The storage may be removable or non-removable, and includes magnetic disks, magnetic tapes or cassettes, compact disc-read only memories (CD-ROMs), compact disc rewritables (CD-RWs), digital video discs (DVDs), or any other medium which may be used to store information and which may be accessed within the computing device. In various embodiments of the present disclosure, the storage may store instructions for the software implementing various embodiments of the present disclosure. The input device(s) may be a touch input device such as a keyboard, mouse, pen, trackball, touch screen, or game controller, a voice input computing device, a scanning computing device, a digital camera, or another device that provides input to the computing device. The output computing device(s) may be a display, printer, speaker, or another computing device that provides output from the computing device. The communication connection(s) enable communication over a communication medium to another computing device or system. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media includes wired or wireless techniques implemented with an electrical, optical, RF, infrared, acoustic, or other carrier. In addition, an interconnection mechanism such as a bus, controller, or network may interconnect the various components of the computer system. In various embodiments of the present disclosure, operating system software may provide an operating environment for software's executing in the computer system, and may coordinate activities of the components of the computer system.

Various embodiments of the present disclosure may be described in the general context of computer-readable media. Computer-readable media are any available media that may be accessed within a computer system. By way of example, and not limitation, within the computer system, computer-readable media include memory, storage, communication media, and combinations thereof.

It should be understood that the inventive concept can be practiced with modification and alteration within the spirit and scope of the appended claims. For example, although certain embodiments of the machine 100 and the machine 200 are described herein, the system of the inventive concept is not limited to being implemented with only the disclosed embodiments. The system may be implemented, for example, with other types of machines. The description is not intended to be exhaustive or to limit the inventive concept to the precise form disclosed. It should be understood that the disclosed concept can be practiced with modification and alteration.

What is claimed is:

1. A self-updating apparatus configured to characterize items or conditions, the apparatus being one apparatus in a network of apparatuses and comprising:
a first processing unit that includes:
a first object unit that receives an item;
a first test unit that applies different types of tests to the item and takes measurements;
a first sensor that receives outcomes from the different types of tests and generates corresponding output signals;
a first computation unit that receives the output signals and processes the output signals to generate parameter values;
a first memory storing parameter data for the item, wherein the parameter data are useful for categorizing the item based on the measurements taken from the item and characteristics calculated using at least one of the measurements and the output signals; and
a first processing module including an artificial intelligence program, the first processing module:
automatically selecting a source from which to receive new parameter data, wherein the first processing module selects the new parameter data to receive based on measurements taken by the first processing unit;
automatically modifying the parameter data that are stored in the first memory using the new parameter data received from the source to generate modified parameter data; and
transmitting a subset of the modified parameter data to a recipient, wherein at least one of the source and the recipient is a second processing unit that is configured similarly to the first processing unit.

2. The self-updating apparatus of claim 1, wherein the computation unit combines the parameter values from the different types of tests to determine a set of risk factors indicating a likelihood that the item includes a target item, wherein the parameter values include visualization data obtained from different measurement angles.

3. The self-updating apparatus of claim 1, wherein the different types of tests include at least one of ionizing radiation test, chemical analysis test, and non-ionizing test.

4. The self-updating apparatus of claim 1, wherein the first sensor is a fused sensor array.

5. The self-updating apparatus of claim 1, wherein at least one of the source and the recipient is a central processing unit in communication with the first processing unit, the central processing unit being configured to receive parameter values from the network of apparatuses, generate updated central parameter data based on received parameter values, and send different subsets of the updated central parameters to select apparatuses in the network of apparatuses.

6. The self-updating apparatus of claim 5, wherein the central processing unit is at a geographically remote location from the first processing unit.

7. The self-updating apparatus of claim 5, wherein the first processing unit is configured to transmit the parameter data to the second processing unit, wherein the parameter data that are transmitted reduce differences between parameter data stored in the first processing unit and the parameter data stored in the second processing unit.

8. The self-updating apparatus of claim 5, wherein the updating of central parameter data adjusts sensitivity levels of the apparatuses to certain items.

9. The self-updating apparatus of claim 5, wherein the first processing unit is configured to request extra information upon encountering an item or condition that is outside previously encountered set of parameter values and transmit received extra information to one of other apparatuses or the central processing unit.

10. The self-updating apparatus of claim 9, wherein the one of the other apparatuses that receives the updated central parameter data modifies its stored internal parameter data by using the received updated central parameter data.

11. The self-updating apparatus of claim 5, wherein the computation unit determines a set of parameter values that include one or more of texture, density, electrical conductivity, molecular class, location, visual classification, radioactive potential, biological class, and biometric class based on the output signals from the first sensor.

12. The self-updating apparatus of claim 5, wherein the central processing unit includes an artificial intelligence program.

13. A non-transitory computer-readable storage medium storing instructions for categorizing items or conditions, wherein the non-transitory computer-readable storage medium is part of a network of apparatuses, comprising:
instructions for the first processing unit to receive an item, apply different types of tests to the item, and take measurements of the item;
instructions to receive outcomes from the different types of tests and generate corresponding output signals;
instructions to process the output signals to generate parameter values;
instructions to store parameter data for the item in a first memory, wherein the parameter data are useful for categorizing the item based on at least one of the measurements taken from the item and characteristics calculated using at least one of the measurements and the output signals;
instructions to automatically select a source from which to receive new parameter data, wherein the first processing module selects the new parameter data to receive based on measurements taken by the first processing unit;
instructions to automatically modify the parameter data that are stored in the first memory using the new parameter data received from the source to generate modified parameter data; and
instructions to transmit a subset of the modified parameter data to a recipient, wherein at least one of the source and the recipient is a second processing unit that is configured similarly to the first processing unit.

14. The non-transitory computer-readable storage medium of claim 13, further comprising instructions to combine the parameter values from the different types of tests to determine a set of risk factors indicating a likelihood that the item includes a target item, wherein the parameter values include visualization data obtained from different measurement angles.

15. The non-transitory computer-readable storage medium of claim 13, wherein the different types of tests include at least one of ionizing radiation test, chemical analysis test, and non-ionizing test.

16. The non-transitory computer-readable storage medium of claim 13, wherein the first sensor is a fused sensor array.

17. The non-transitory computer-readable storage medium of claim 13, wherein at least one of the source and the recipient is a central processing unit that is in communication with the first processing unit, the central processing unit being configured to receive parameter values from the network of apparatuses, generate updated central parameters based on received parameter values, and send different subsets of the updated central parameters to selected apparatuses in the network of apparatuses.

18. The non-transitory computer-readable medium of claim 17, wherein the central processing unit is at a geographically remote location from the first processing unit.

19. The non-transitory computer-readable medium of claim 17, further comprising instructions for the first processing unit to transmit the parameter data to the second processing unit, wherein the parameter data that are transmitted reduce differences between parameter data stored in the first processing unit and the parameter data stored in the second processing unit.

20. The non-transitory computer-readable medium of claim 13, wherein the instructions to process the output signals to generate parameter values includes instructions to determine a set of parameter values that include one or more of texture, density, electrical conductivity, molecular class, location, visual classification, radioactive potential, biological class, and biometric class based on the output signals from the first sensor.

\* \* \* \* \*